(12) United States Patent
Ramakrishnan et al.

(10) Patent No.: US 12,414,009 B2
(45) Date of Patent: Sep. 9, 2025

(54) DISCOVERING A RADIO CONTROLLER IN A CLOUD RADIO ACCESS NETWORK

(71) Applicant: Outdoor Wireless Networks LLC, Richardson, TX (US)

(72) Inventors: Shanthakumar Ramakrishnan, Westford, MA (US); Irfaan Ahamed Salahuddeen, Acton, MA (US); Sunit Kumar Sharma, Groton, MA (US); Vishwas Patodia, Nashua, NH (US); Selvamuthukumar Senthilvelan, Nashua, NH (US)

(73) Assignee: Outdoor Wireless Networks LLC, Richardson, TX (US)

( * ) Notice: Subject to any disclaimer, the term of this patent is extended or adjusted under 35 U.S.C. 154(b) by 806 days.

(21) Appl. No.: 17/670,022

(22) Filed: Feb. 11, 2022

(65) Prior Publication Data

US 2022/0286910 A1  Sep. 8, 2022

Related U.S. Application Data

(60) Provisional application No. 63/157,961, filed on Mar. 8, 2021.

(51) Int. Cl.
| | | |
|---|---|---|
| *H04W 4/00* | (2018.01) | |
| *H04W 28/08* | (2023.01) | |
| *H04W 28/18* | (2009.01) | |
| *H04W 48/08* | (2009.01) | |
| *H04W 48/16* | (2009.01) | |
| *H04W 72/30* | (2023.01) | |

(52) U.S. Cl.
CPC ....... *H04W 28/0846* (2020.05); *H04W 28/18* (2013.01); *H04W 48/08* (2013.01); *H04W 48/16* (2013.01); *H04W 72/30* (2023.01)

(58) Field of Classification Search
CPC ............ H04W 28/0846; H04W 28/18; H04W 48/08; H04W 48/16
USPC ......................................................... 370/329
See application file for complete search history.

(56) References Cited

U.S. PATENT DOCUMENTS

| | | |
|---|---|---|
| 2016/0088610 A1 | 3/2016 | Abraham et al. |
| 2017/0257150 A1 | 9/2017 | Chae et al. |
| 2018/0191873 A1 | 7/2018 | Bao et al. |

(Continued)

OTHER PUBLICATIONS

International Searching Authority, "International Search Report and Written Opinion" from PCT Application No. PCT/US2022/016146 dated May 26, 2022, from Foreign Counterpart to U.S. Appl. No. 17/670,022, pp. 1 through 11, Published in: KR.

*Primary Examiner* — Temica M Beamer
(74) *Attorney, Agent, or Firm* — Fogg & Powers LLC

(57) ABSTRACT

A distributed radio access network (RAN) includes a new radio unit (RU) being connected to a front-haul network. The new RU determines its own Internet Protocol (IP) address based on its MAC address; and send a discovery message to all radio controllers in the front-haul network via a multicast address. The distributed RAN also includes a plurality of radio controllers communicatively coupled to the new RU via the front-haul network. Each of the plurality of radio controllers are configured to receive the discovery message and determine whether the new RU is assigned to the respective radio controller. Each of at least one radio controller, to which the new RU is assigned, establishes at least one configuration session with the new RU.

40 Claims, 9 Drawing Sheets

(56) References Cited

U.S. PATENT DOCUMENTS

| | | |
|---|---|---|
| 2019/0245740 A1 | 8/2019 | Kachhla |
| 2019/0320494 A1* | 10/2019 | Jayawardene ...... H04L 61/5007 |
| 2020/0092171 A1* | 3/2020 | Ramakrishnan .... H04L 41/0809 |
| 2020/0204252 A1 | 6/2020 | Barbieri et al. |

* cited by examiner

DISCOVERING A RADIO CONTROLLER IN A CLOUD RADIO ACCESS NETWORK

CROSS-REFERENCE TO RELATED APPLICATIONS

This application claims the benefit of U.S. Provisional Patent Application Ser. No. 63/157,961 filed on Mar. 8, 2021, entitled "DISCOVERING A RADIO CONTROLLER IN A CLOUD RADIO ACCESS NETWORK", the entirety of which is incorporated herein by reference.

BACKGROUND

In a distributed radio access network (RAN), geographically separated radio units (RUs) are controlled by centralized unit(s) and provide wireless service to nearby user equipment (UEs). It is desirable for an RU to dynamically discover a radio controller upon being powered up.

SUMMARY

A distributed radio access network (RAN) includes a new radio unit (RU) being connected to a front-haul network. The new RU determines its own Internet Protocol (IP) address based on its MAC address; and send a discovery message to all radio controllers in the front-haul network via a multicast address. The C-RAN also includes a plurality of radio controllers communicatively coupled to the new RU via the front-haul network. Each of the plurality of radio controllers are configured to receive the discovery message and determine whether the new RU is assigned to the respective radio controller. Each of at least one radio controller, to which the new RU is assigned, establishes at least one configuration session with the new RU.

A distributed radio access network (RAN) includes a new radio unit (RU) being connected to a plurality of radio controllers via a front-haul network. The new RU is also configured to request, from a Dynamic Host Configuration Protocol (DHCP) server after the new RU powers up a first time, IP addresses for each radio controller it is assigned to. The DHCP server is configured to send a response to the new RU indicating a number of IP addresses equal to a number of carriers the new RU needs to establish, each of the IP addresses belonging to a radio controller the new RU is assigned to. The new RU initiates a different configuration session for each carrier it needs to establish with each radio controller it is assigned to.

DRAWINGS

Understanding that the drawings depict only exemplary configurations and are not therefore to be considered limiting in scope, the exemplary configurations will be described with additional specificity and detail through the use of the accompanying drawings, in which.

Figure 1A:
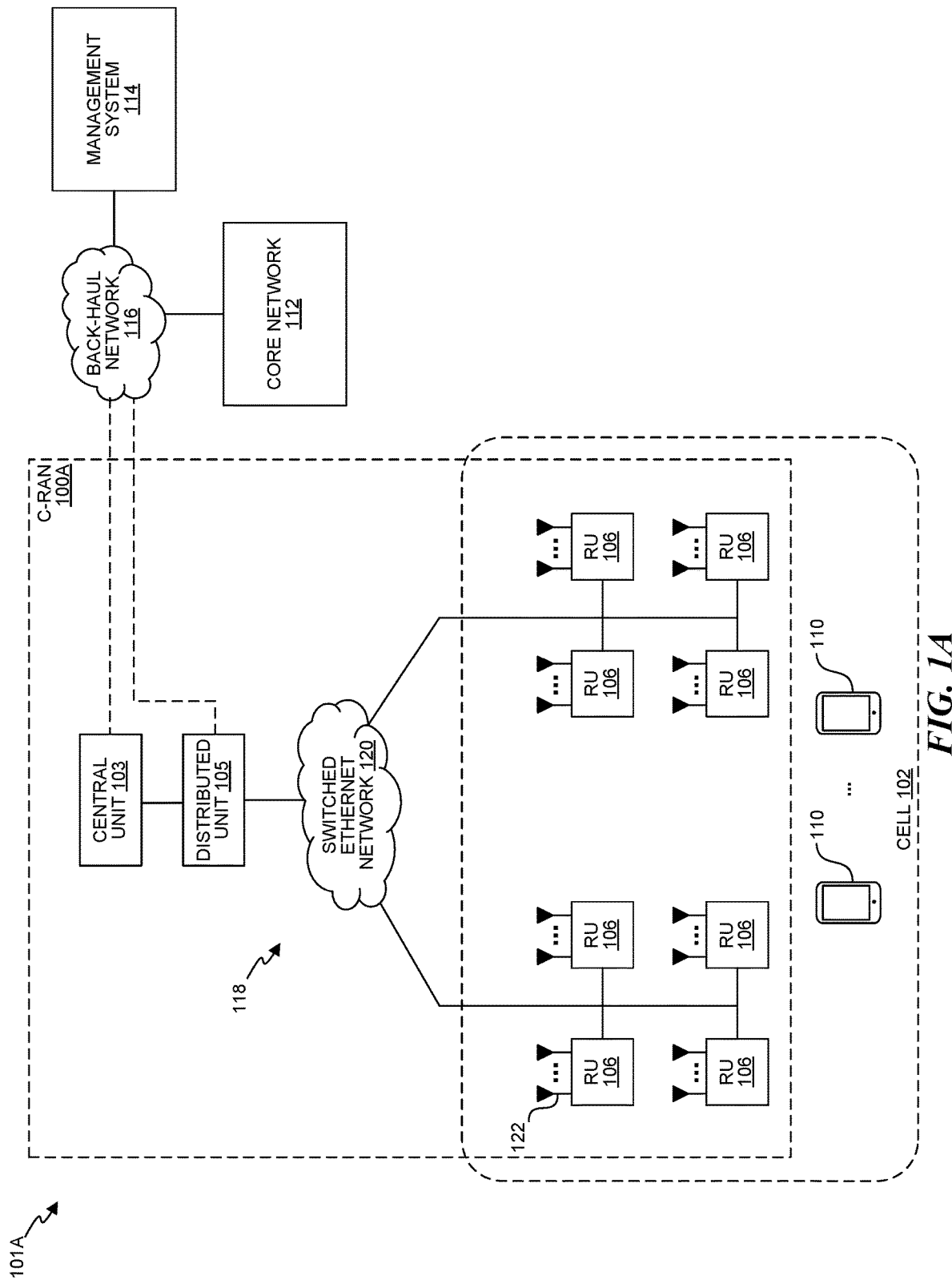
FIG. 1A is a block diagram illustrating an exemplary configuration of a system implementing radio controller discovery in a C-RAN.

In accordance with common practice, the various described features are not drawn to scale but are drawn to emphasize specific features relevant to the exemplary configurations.

DETAILED DESCRIPTION

In some configurations, a Third Generation Partnership Project (3GPP) Fourth Generation (4G) C-RAN will include multiple devices (e.g., baseband controller unit(s), radio units (RUs), RF units (antenna arrays)) interfaced together to enable and implement RAN functions. In a typical 3GPP Fifth Generation (5G) C-RAN, there may be further logical and/or physical splits in the devices (e.g., centralized unit(s) (CU(s)), distributed unit(s) (DU(s)), radio units (RUs), RF units (antenna arrays)), which are interfaced together to enable and implement RAN functions.

The Open Radio Network Alliance (O-RAN) Alliance is seeking to standardize certain aspects of cloud radio access network operation. In O-RAN specifications (available at https://www.o-ran.org/specifications), RUs are controlled by a "radio controller", which can be implemented in a baseband controller (in 4G) or a DU or CU (in 5G). In the examples below, the radio controller is generally described as being located in the DU(s), however other configurations are possible. Thus, where the term "radio controller" is used herein, it may refer to a 4G baseband controller, a 5G DU, or a 5G CU.

A distributed antenna system (DAS) (not shown) is another type of distributed RAN that includes at least two RUs 106 and a centralized distribution unit (sometimes referred to as a "head unit"). The RUs 106 can wirelessly transmit signals to UEs 110 in a coverage area. The distribution unit can communicate channelized digital baseband signals with the RUs 106. The channelized digital baseband signals may include call information for wireless communication. The DAS may implement additional devices and/or functionality. A DAS may implement any suitable air interface, e.g., Third Generation Partnership Project (3GPP) 3G, 4G, and/or 5G air interface(s). In some configurations, a radio controller can be implemented in a head unit in a distributed antenna system. Thus, while C-RANs are generally used in the examples below, the present systems and methods could equally apply to different implementations of distributed RANs, e.g., DAS.

Upon joining a front-haul network (e.g., powering up for the first time after being connected to the front-haul network) in a C-RAN, a RU needs to be assigned an IP address and discover its radio controller (that will configure and manage the RU). The O-RAN specification proposes different ways for the RU to be allocated an IP address and discover its radio controller. One proposed way is to have that IP address of the radio controller and/or RU pre-shared (e.g., hard-coded) on both radio controllers and RUs so they can communicate with each other upon power up without any discovery procedures.

A more dynamic O-RAN proposal is for the RU to contact a Dynamic Host Configuration Protocol (DHCP) server after power up, after which the DHCP server assigns the RU an IP address and also sends the IP address of its radio controller to the RU. While IPv6 IP addresses are discussed in the examples below, it should be noted that any of the IP addresses may alternatively be Internet Protocol version 4 (IPv4) IP addresses.

In contrast, in a first example configuration, the present systems and methods use a dynamic approach for radio controller discovery that does not require a DHCP server. Specifically, in the first example configuration, a radio unit (RU) determines its IP address (e.g., its IPv6 address) and multicasts a neighbor solicitation (NS) message to all devices on the same network. In response, only the radio controller(s) (e.g., 5G DU(s)) to which the RU is assigned will respond with a neighbor advertisement and initiate a Network Configuration Protocol (NETCONF) session with the RU to configure the RU for operation. Each radio controller may be pre-loaded with a whitelist that indicates MAC addresses (e.g., which can also serve as the serial numbers) of RUs that are assigned to it, so each radio controller can (1) determine whether it needs to respond to a neighbor solicitation from a particular RU (e.g., based on whether the RU's Media Access Control (MAC) address is listed in the radio controller's whitelist); and (2) if the RU is assigned to the radio controller, the radio controller may initiate a NETCONF session with the RU (e.g., using the RU's link-local IPv6 address from the configured MAC address) without waiting for the RU to initiate the NETCONF session. Because the radio controller initiates a NETCONF session using the whitelist, traffic is reduced within the front-haul network of a C-RAN compared to other non-DHCP solutions. For example, if all radio controllers were instead required to respond to every RU's neighbor solicitation in a C-RAN (e.g., with multiple DUs and up to 128 RUs), the resulting traffic from excess neighbor acknowledgements may unnecessarily consume bandwidth in the front-haul network.

While NETCONF is used in examples herein, any suitable configuration management protocol can be used between the radio controller and RU in order to configure the RU.

In a second example configuration, the present systems and methods extend the O-RAN DHCP proposal, which limits communication to one radio controller and one RU, i.e., in O-RAN the DHCP server sends back to the RU a single radio controller Internet Protocol (IP) address and a single RU IP address. However, RUs can, in some cases, initiate multiple connections with multiple radio controllers (e.g., DUs). For example, in some configurations, RUs can include N-carrier hardware (e.g., where N=4) that is capable of simultaneously working with up to four 5G gNB DUs and/or 4G LTE baseband controllers to serve up to 4 different cells.

Accordingly, in the second example configuration of the present systems and methods, the DHCP server sends back IP addresses for one or more radio controllers (and if the radio controller can initiate N connections with the same RU, its IP address will be listed N times). So when the RU gets this list from the DHCP server, it knows how many connections to each radio controller it needs to entertain. Thus, the second example configuration herein allows discovery of radio controllers in a multi-carrier and/or multi-operator system, which is not contemplated by the O-RAN DHCP proposal.

Example 5G C-RAN

FIG. 1A is a block diagram illustrating an exemplary configuration of a system 101A implementing radio controller discovery in a C-RAN 100A. In the exemplary embodiment shown in FIG. 1A, a base station employs a centralized or cloud RAN (C-RAN) architecture for each cell (or sector) 102 served by the base station 100A, with the following logical nodes: at least one control unit (CU) 103, at least one distributed unit (DU) 105, and multiple radio units (RUs) 106. Each RU 106 is remotely located from each CU 103 and DU 105 serving it. Also, in this exemplary embodiment, at least one of the RUs 106 is remotely located from at least one other RU 106 serving that cell 102.

The C-RAN 100A can be implemented in accordance with one or more public standards and specifications. In some configurations, the C-RAN 100A is implemented using the logical RAN nodes, functional splits, and front-haul interfaces defined by the O-RAN Alliance. In such an O-RAN example, each CU 103, DU 105, and RU 106 can be implemented as an O-RAN central unit (CU), O-RAN distributed unit (DU), and O-RAN radio unit (RU), respectively, in accordance with the O-RAN specifications.

That is, each CU 103 comprises a logical node hosting Packet Data Convergence Protocol (PDCP), Radio Resource Control (RRC), Service Data Adaptation Protocol (SDAP), and other control functions. Therefore, each CU 103 implements the gNB controller functions such as the transfer of user data, mobility control, radio access network sharing, positioning, session management, etc. The CU(s) 103 control the operation of the Distributed Units (DUs) 105 over an interface (including F1-c and F1-u for the control plane and user plane, respectively).

In FIG. 1A, the C-RAN 100A includes a single CU 103, which handles control plane functions, user plane functions, some non-real-time functions, and/or Packet Data Convergence Protocol (PDCP) processing. The CU 103 (in the C-RAN 100A) may communicate with at least one wireless service provider's Next Generation Cores (NGC) 112 using 5G NGc and 5G NGu interfaces. In some 5G configurations (not shown in FIG. 1A), a CU 103 is split between a CU-CP that handles control plane functions and a CU-UP that handles user plane functions.

In some configurations, each DU 105 comprises a logical node hosting (performing processing for) Radio Link Control (RLC) and Media Access Control (MAC) layers, as well as optionally the upper or higher portion of the Physical (PHY) layer (where the PHY layer is split between the DU 105 and RU 106). In other words, the DUs 105 implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. As noted above, a DU 105 (or a CU 103) may act as a "radio controller" for one or more RUs 106 in a 5G C-RAN 100A operating according to O-RAN specifications.

Each RU 106 comprises a logical node hosting the portion of the PHY layer not implemented in the DU 105 (that is, the lower portion of the PHY layer) as well as implementing the basic RF and antenna functions. In some 5G configurations, the RUs (RUs) 106 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Although the CU 103, DU 105, and RUs 106 are described as separate logical entities, one or more of them can be implemented together using shared physical hardware and/or software. For example, in the exemplary embodiment shown in FIG. 1A, for each cell 102, the CU 103 and DU 105 serving that cell 102 could be physically implemented together using shared hardware and/or software, whereas each RU 106 would be physically implemented using separate hardware and/or software. Alternatively, the CU(s) 103 may be remotely located from the DU(s) 105.

Also, in the exemplary embodiment described here in connection with FIG. 1A, the C-RAN 100A is implemented as a Fifth Generation New Radio (5G NR) RAN that supports a 5G NR wireless interface in accordance with the 5G NR specifications and protocols promulgated by the 3rd Generation Partnership Project (3GPP). Thus, in some configurations, the C-RAN 100A can also be referred to as a "Next Generation Node B" 100, "gNodeB" 100, or "gNB" 100.

Each RU 106 includes or is coupled to one or more antennas 122 via which downlink RF signals are radiated to various items of user equipment (UE) and via which uplink RF signals transmitted by UEs 110 are received.

The CU 103 and/or DU(s) 105 may be coupled to a core network 112 of the associated wireless network operator over an appropriate back-haul network 116 (such as the Internet). Also, each DU 105 is communicatively coupled to the RUs 106 served by it using a front-haul network 118. Each of the DU(s) 105 and RUs 106 include one or more network interfaces (not shown) to enable the DU(s) 105 and RUs 106 to communicate over the front-haul network 118.

In one implementation, the front-haul 118 that communicatively couples the DU(s) 105 to the RUs 106 is implemented using a switched ETHERNET network 120. In such an implementation, each DU 105 and RU 106 includes one or more ETHERNET interfaces for communicating over the switched ETHERNET network 120 used for the front-haul 118. However, it is to be understood that the front-haul 118 between each DU 105 and the RUs 106 served by it can be implemented in other ways.

Each CU 103, DU 105, and RU 106, (and the functionality described as being included therein), as well as any other device in the system 101A more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 103, DU 105, RU 106, and the system 101A more generally, can be implemented in other ways.

As noted above, in the exemplary configuration described here in connection with FIG. 1A, the C-RAN 100A is implemented as a 5G NR RAN that supports a 5G NR wireless interface to wirelessly communicate with the UEs 110.

More specifically, in the exemplary embodiment described here in connection with FIG. 1A, the 5G NR wireless interface may support the use of beamforming for wirelessly communicating with the UEs 110 in both the downlink and uplink directions using the millimeter wave (mmWave) radio frequency (RF) range defined for 5G NR (Frequency Range 2 or "FR2"), e.g., ranging from 24 GHz to 40 or 100 GHz. 5G NR RAN systems typically make use of fine beams and beamforming, especially when FR2 is used. To perform such beamforming, each RU 106 comprises an array of multiple, spatially separated antennas 122. When FR2 is used, the spacing of the antennas 122 in the array is on the order of several millimeters (as opposed to several centimeters as is the case when FR1 is used) and can be implemented in a convenient fashion.

In some configurations, the C-RAN 100A may implement uplink combining in which a group of RUs 106 (e.g., up to four) receive RF signals from a particular UE 110 and a DU 105 and/or CU 103 combines them (e.g., using a maximum likelihood combining) into a single uplink signal. Additionally or alternatively, the C-RAN 100A may implement downlink combining in which a group of RUs 106 send downlink RF signals to a particular UE 110, which combines them (e.g., using a maximum likelihood combining) into a single downlink signal.

A management system 114 may be communicatively coupled to the CU(s) 103, DU(s) 105, and/or RUs 106, for example, via the back-haul network 116 and/or the front-haul network 118. The management system 114 may assist in managing and/or configuring the C-RAN 100A. A hierarchical architecture can be used for management-plane ("M-plane") communications. When a hierarchical architecture is used, the management system 114 can send and receive M-plane (management) communications to and from the DU 105, which in turn forwards relevant M-plane communications to and from the RUs 106 as needed. Alternatively, a direct architecture can also be used for M-plane communications. When a direct architecture is used, the management system 114 can communicate directly with the RUs 106 (without having the M-plane communications forwarded by the CU 103 or DU 105). A hybrid architecture can also be used in which some M-plane communications are communicated using a hierarchical architecture and some M-plane communications are communicated using a direct architecture. Proprietary protocols and interfaces can be used for such M-plane communications. Also, protocols and interfaces that are specified by standards such as O-RAN can be used for such M-plane communications.

Example 4G C-RAN

Figure 1B:
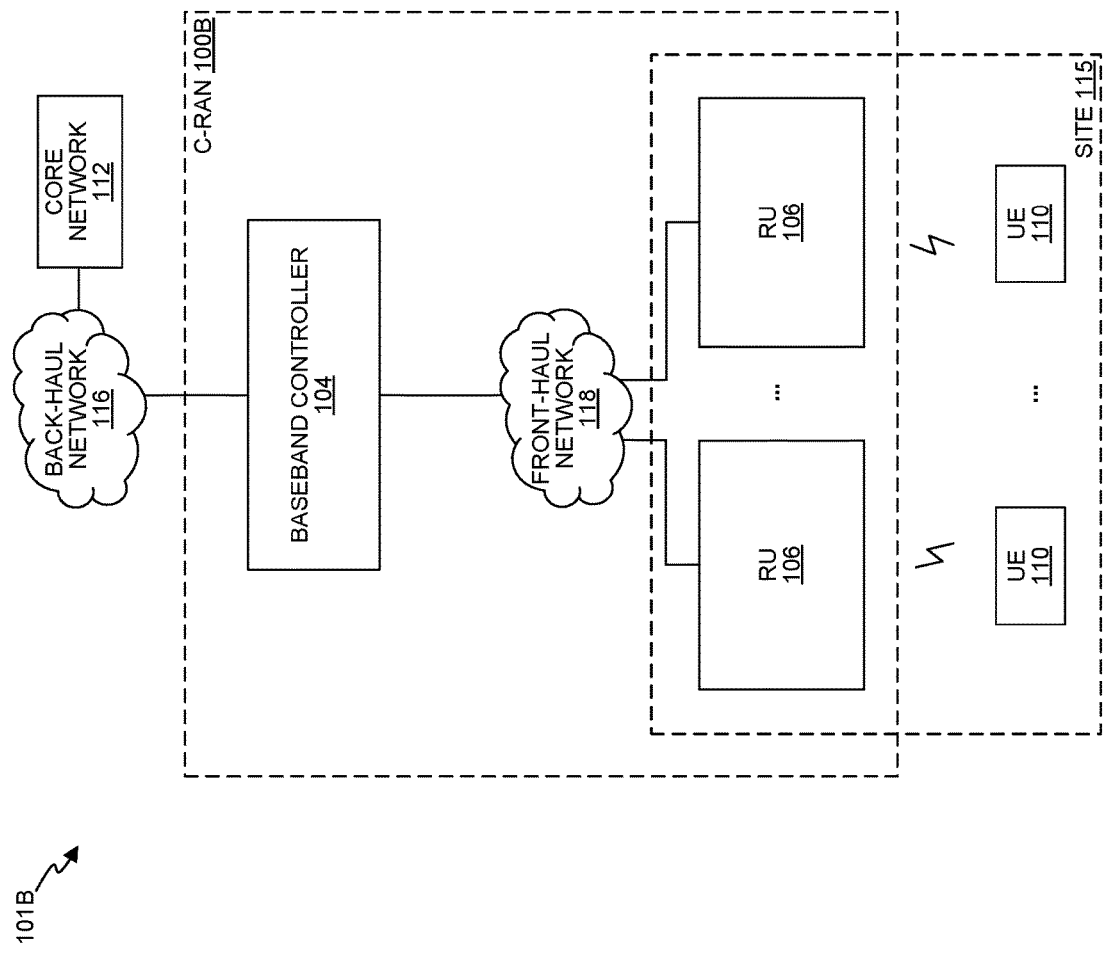
FIG. 1B is a block diagram illustrating another exemplary configuration of a system implementing radio controller discovery in a C-RAN.

FIG. 1B is a block diagram illustrating another exemplary configuration of a communication system 101B implementing radio controller discovery in a C-RAN 100B. In the exemplary configuration shown in FIG. 1B, the system 101B is implemented using a cloud radio access network (C-RAN) (point-to-multipoint distributed base station) architecture that employs at least one baseband unit 104 and one or more radio units 106.

The RUs 106 may be deployed at a site 115 to provide wireless coverage and capacity for one or more wireless network operators. The site 115 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium, or a densely-populated downtown area). In some configurations, the site 115 is at least partially (and optionally entirely) indoors, but other alternatives are possible.

The C-RAN 100B may include a baseband unit 104, which may also be referred to as "baseband controller" 104, or just "controller" 104. Each radio unit (RU) 106 may include or be coupled to at least one antenna used to radiate downlink RF signals to user equipment (UEs) 110 and receive uplink RF signals transmitted by UEs 110. The baseband controller 104 may optionally be physically located remotely from the site 115, e.g., in a centralized bank of baseband controllers 104. Additionally, the RUs 106 may be physically separated from each other within the site 115, although they are each communicatively coupled to the baseband controller 104 via a front-haul network 118 (or just "front-haul"). Communication relating to L1 functions generally relies on the front-haul network 118 interface. As before, every RU 106 in the system 100B may transmit the same or different cell-ID for each of the cell(s) they all serve, depending on the number of carriers and frequency reuse layers. As noted above, a baseband controller 104 may be referred to as a "radio controller" for one or more RUs 106 in a 4G C-RAN 100B operating according to O-RAN specifications.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RU 106 may be a computing device with at least one processor that executes instructions stored in memory. Furthermore, each RU 106 may optionally implement one or more RU instances, e.g., a processing core that executes instructions that implement the functionality of an RU 106.

The C-RAN 100B may optionally implement frequency reuse where the same frequency resource(s) are used for multiple sets of UEs 110, each set of UEs 110 being under a different, geographically diverse set of RUs 106 (all serving the same cell).

The system 100B is coupled to a core network 112 of each wireless network operator over an appropriate back-haul network 116. For example, the Internet may be used for back-haul 116 between the system 100B and each core network 112. However, it is understood that the back-haul network 116 can be implemented in other ways. Communication relating to L3 functions generally relies on the back-haul network 116 interface. Each of the back-haul network 116 and/or the front-haul network 118 described herein may be implemented with one or more network elements, such as switches, routers, and/or other networking devices. For example, the back-haul network 116 and/or the front-haul network 118 may be implemented as a switched ETHERNET network.

The system 100B may be implemented as a Long Term Evolution (LTE) radio access network providing wireless service using the LTE air interface. LTE is a standard developed by the 3GPP standards organization. In this configuration, the baseband controller 104 and RUs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., the system 100B may be implemented as a 3GPP 5G RAN providing wireless service using a 5G air interface, as described below.

Also, in an exemplary LTE configuration, each core network 112 may be implemented as an Evolved Packet Core (EPC) 112 comprising standard LTE EPC network devices such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio unit 106 can be implemented so as to use an air interface that supports one or more of frequency-division duplexing (FDD) and/or time-division duplexing (TDD). Also, the baseband controller 104 and the radio units 106 can be implemented to use an air interface that supports one or more of the multiple-input-multiple-output (MIMO), single-input-single-output (SISO), single-input-multiple-output (SIMO), and/or beam forming schemes. For example, the baseband controller 104 and the radio units 106 can implement one or more of the LTE transmission modes. Moreover, the baseband controller 104 and the radio units 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RUs 106. Communicating such baseband I/Q data typically requires a relatively high data rate front haul.

In some configurations, a baseband signal can be pre-processed at a source RU 106 and converted to frequency domain signals (after removing guard band/cyclic prefix data, etc.) in order to effectively manage the front-haul rates, before being sent to the baseband controller 104. Each RU 106 can further reduce the data rates by quantizing such frequency domain signals and reducing the number of bits used to carry such signals and sending the data. In a further simplification, certain symbol data/channel data may be fully processed in the source RU 106 itself and only the resultant information is passed to the baseband controller 104.

The Third Generation Partnership Project (3GPP) has adopted a layered model for the LTE radio access interface. Generally, some combination of the baseband controller 104 and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RUs 106) may be implemented. Where baseband signal I/Q data is front-hauled between the baseband controller 104 and the RUs 106, each baseband controller 104 can be configured to perform all or some of the digital L1, L2, and L3 processing for the air interface. In this case, the L1 functions in each RU 106 is configured to implement all or some of the digital L1 processing for the air interface.

Where a front-haul ETHERNET network 118 is not able to deliver the data rate need to front haul (uncompressed) I/Q data, the I/Q data can be compressed prior to being communicated over the ETHERNET network 118, thereby reducing the data rate needed communicate such I/Q data over the ETHERNET network 118.

Data can be front-hauled between the baseband controller 104 and RUs 106 in other ways, for example, using front-haul interfaces and techniques specified in the Common Public Radio Interface (CPRI) and/or Open Base Station Architecture Initiative (OBSAI) family of specifications. The baseband controller 104 described herein may be similar to and/or perform at least some of the functionality of the O-RAN Distributed Unit (0-DU).

Where functionality of a 5G DU 105 is discussed herein, it is equally applicable to a 5G CU 103 or a 4G baseband controller 104. Therefore, where a C-RAN 100 is described herein, it may include 5G elements (as in FIG. 1A) and/or 4G elements (as in FIG. 1B).

Example Multi-Operator System with Multi-Instance RUs

Figure 2A:
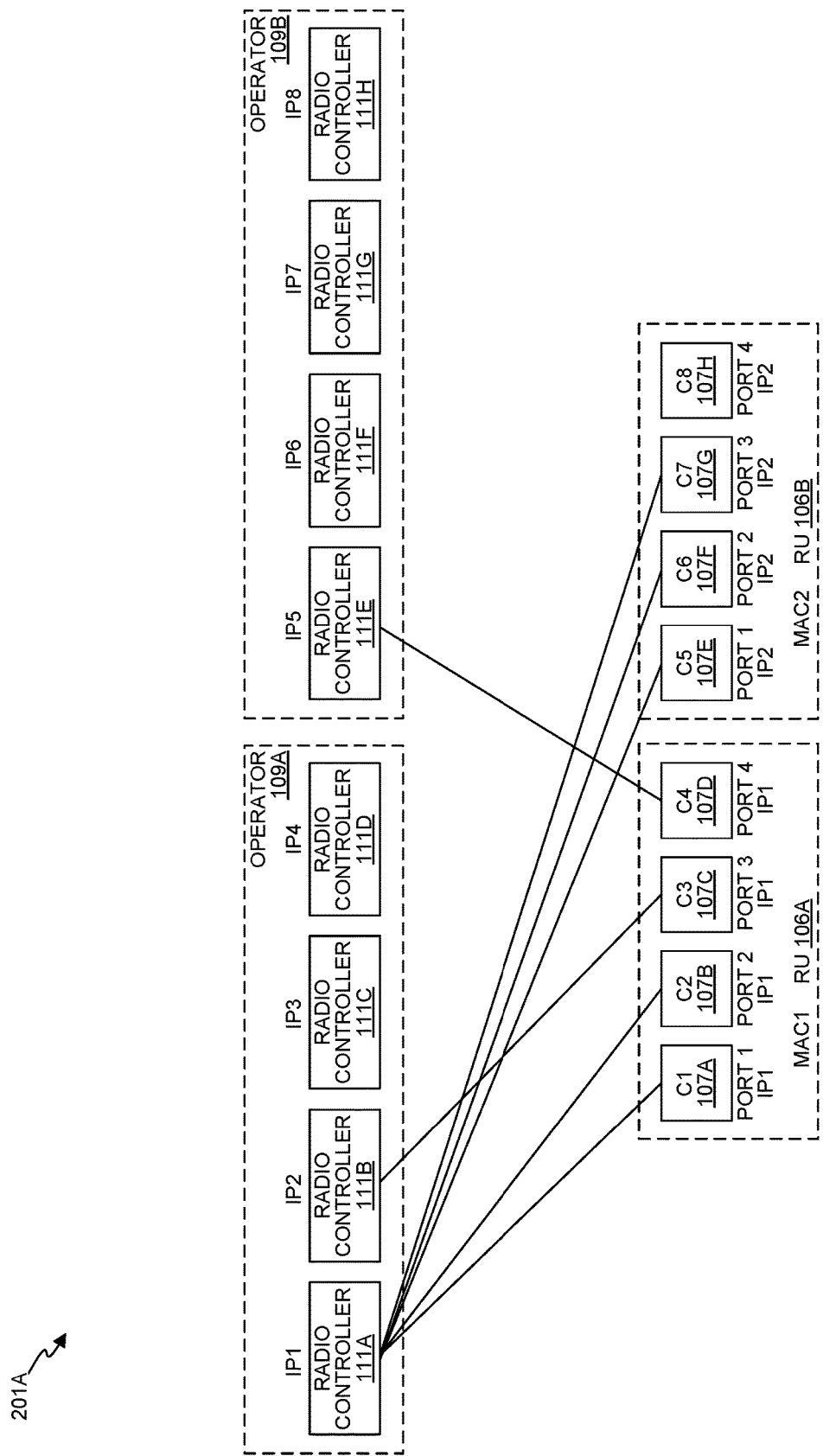
FIG. 2A is a block diagram illustrating a multi-operator system with multi-instance RUs.

FIG. 2A is a block diagram illustrating a multi-operator 109 system 201A with multi-instance RUs 106A-B. It is understood that, even though a front-haul network 118 and a back-haul network 116 are not explicitly illustrated, they would generally be present in the system 201A. Furthermore, the system 201A may also have at least one core network 112 (e.g., one for each operator 109), at least one management system 114 (e.g., one for each operator 109), and possibly additional base stations nearby.

Furthermore, it is understood that the designation of "network operator" or "operator" (and dotted line delineating such in FIG. 2A) does not denote that all radio controllers 111 associated with a particular operator 109 are necessarily co-located. To the contrary, at least some of the radio controllers 111 associated with a particular operator 109 the gNB 100 may be physically remote from each other. It is understood that the specific configuration illustrated in FIG. 2A is merely exemplary, and any number/type of each node may exist in the system 201A.

The system 201A includes multiple network operators 109A-B, such as T-Mobile®, Verizon®, or ATT®, each operator 109 deploying, configuring, and controlling various base stations, such as macro base station(s), C-RAN(s) 100, and/or other small cell(s).

The radio controllers 111A-H may be CUs 103 or DUs 105 in 5G C-RAN(s) 100A and/or baseband controllers 104 in 4G C-RAN(s) 100B, e.g., any of which may operate according to O-RAN specifications. Each radio controller 111 may be assigned its own respective IP address (IP1-IP8 in FIG. 2A). The radio controllers 111 associated with a particular operator 109 may belong to the same C-RAN 100 or different C-RANs 100, e.g., a single operator 109 could implement multiple C-RANs 100.

Even though the radio controllers 111 correspond to different operators 109, the radio controllers 111 may still be able to receive uplink signals, and to transmit downlink signals, using some of the same RUs 106A-B. Each RU 106 may optionally implement more than one RU instance 107A-H (e.g., modules). In some examples, each RU instance 107 within a multi-instance RU 106 may be implemented as an independent digital instance (e.g., a processing core) on one or more programmable processors in the multi-instance RU 106 within a single physical housing, e.g., where each programmable processor is a field programmable gate array (FPGA), an application specific integrated circuit (ASIC), a microprocessor, or a digital signal processor (DSP).

Each multi-instance RU 106, like the ones shown in FIG. 2A, may have multiple ETHERNET ports, each being assigned to a different RU instance 107. The term "ETHERNET port" used herein generally refers, without limitation, to a logical port within an RU 106 within hardware on an RU 106, e.g., a Transmission Control Protocol (TCP) port or a User Data gram Protocol (UDP) port. In some configurations, an RU 106 may have a single physical port and multiple logical ports (referred to as simply "ETHERNET ports"). Thus, each RU instance 107 may use a respective ETHERNET port. Thus, each RU instance 107 in an RU 106 can share the same physical port (and the same IP address) but have distinct communication sessions with external device(s).

In FIG. 2A, for example, in a first multi-instance RU 106A, a first RU instance (C1) 107A may be assigned to ETHERNET port 1 in the RU 106A with IP address 1, a second RU instance (C2) 107B may be assigned to ETHERNET port 2 in the RU 106A with IP address 1, a third RU instance (C3) 107C may be assigned to ETHERNET port 3 in the RU 106A with IP address 1, and a fourth RU instance (C4) 107D may be assigned to ETHERNET port 4 in the RU 106A with IP address 1. Therefore, in some configurations, each RU instance 107 in a multi-instance RU 106 may use a different ETHERNET port, but all RU instances 107 in the multi-instance RU 106 may share the same IP address. Additionally, in some configurations, each RU instance 107 in a multi-instance RU 106 may share the same MAC address.

As shown in FIG. 2A, multiple RU instances 107 in a multi-instance RU 106 may each initiate a separate connection with the same radio controller 111 (on a separate ETHERNET port), e.g., each RU instance 107 being configured with a different NETCONF session. For example, the first RU instance (C1) 107A and the second RU instance (C2) 107B in the first RU 106 may each be assigned to (and be configured by) the first radio controller 111A associated with the first operator 109A. Similarly, each of the first three RU instances 107E-G in the second RU 106 may each be assigned to (and be configured by) the first radio controller 111A associated with the first operator 109A.

Alternatively or additionally, multiple RU instances 107 in a multi-instance RU 106 may each initiate a separate connection to different respective radio controllers 111 associated with the same operator 109. For example, the second RU instance (C2) 107B in the first RU 106 may be assigned to (and be configured by) the first radio controller 111A associated with the first operator 109A, while the third RU instance (C3) 107C in the first RU 106 may be assigned to (and be configured by) the second radio controller 111B associated with the first operator 109A.

Alternatively or additionally, multiple RU instances 107 in a multi-instance RU 106 may each initiate a separate connection to different radio controllers 111 associated with different operators 109. For example, the third RU instance (C3) 107C in the first RU 106 may be assigned to (and be configured by) the second radio controller 111B associated with the first operator 109A, while the fourth RU instance (C4) 107B in the first RU 106 may each be assigned to (and be configured by) the first radio controller 111E associated with the second operator 109B.

After an RU 106 powers up, it may be configured to discover the radio controller 111 it is assigned to and be configured by that radio controller 111 via a NETCONF session. Among other things, the radio controller 111 may inform the RU's operational parameters, e.g., the RU's operating channel(s) (RF band), bandwidth, downlink and uplink carrier information, Root Sequence Index (RSI), Physical Cell Identity (PCI), operating power, user profile management information, file and log upload configuration, software management information, etc.).

Additionally, the radio controller 111 may also indicate to the RU 106 how many carriers it will need to support for that radio controller 111. In other words, the radio controller 111 may inform the RU 106, during configuration, how many connections the RU 106 will have to maintain with the radio controller 111, where a different connection from a different RU instance 107 may be established between the radio controller 111 and RU 106 for each carrier/connection. For example, the number of carriers may be communicated outside the NETCONF session, e.g., during transmission of DU IP addresses in response to DHCP Vendor Option data request from RU. In some examples, the radio controller 111 may signal the number of carriers via M-plane communication.

Example Multi-gNB System with Multi-Instance RUs

Figure 2B:
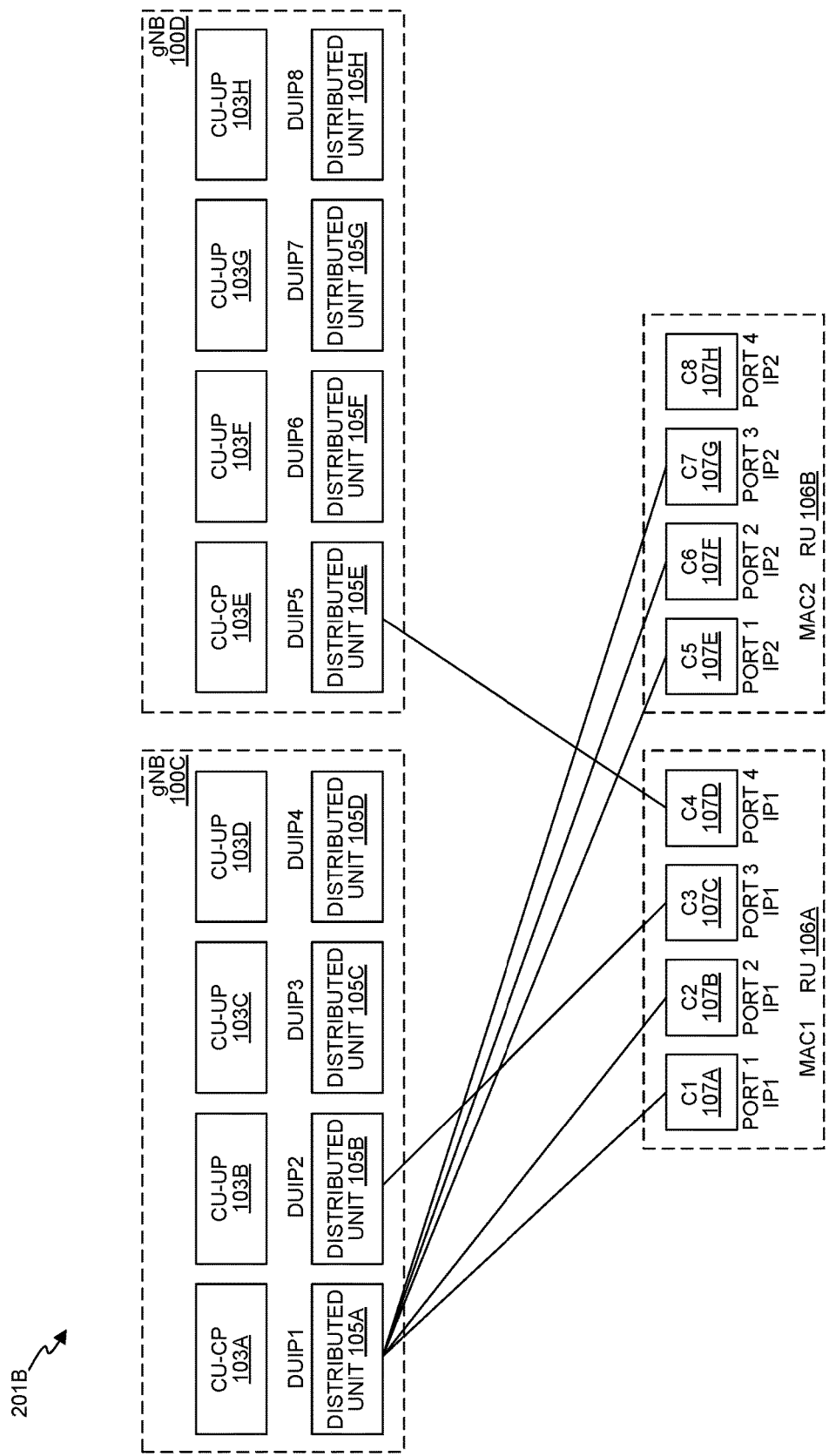
FIG. 2B is a block diagram illustrating another multi-gNB system with multi-instance RUs.

FIG. 2B is a block diagram illustrating another multi-gNB system 201B with multi-instance RUs 106A-B. It is understood that the various nodes may be communicatively coupled to each other, even though not shown in FIG. 2B. For example, the each DU 105A-H would be communicatively coupled to at least one CU 103A-H and each RU instance (C1-C8) 107A-H. Therefore, even though a fronthaul network 118 and a back-haul network 116 are not explicitly illustrated, they would generally be present. Furthermore, the system 201B may also have at least one core network 112 (e.g., one for each operator 109 in the system 201B), at least one management system 114 (e.g., one for each operator 109 in the system 201B), and possibly additional base stations nearby.

Furthermore, it is understood that the designation of "gNB" (and dotted line delineating such in FIG. 2B) does not denote that all CUs 103 and DUs 105 serving the gNB 100 are necessarily co-located. To the contrary, at least some of the CUs 103 and/or DUs 105 serving the gNB 100 may be physically remote from each other.

The system 201B includes multiple gNBs 100C-D, each corresponding to, and being controlled by, a particular network operator 109 such as T-Mobile®, Verizon®, or ATT®, each gNB 100 having at least one CU 103 and multiple DUs 105. As noted briefly above, the CU 103 in each gNB 100 in FIG. 2B may be split between a CU-CP 103A, E that handles control plane functions and one or more CU-UPs 103B-D, F-H that handle user plane functions. Accordingly, each gNB 100 in FIG. 2B includes a single CU-CP 103A, E and multiple CU-UPs 103B-D, F-H. It is understood that the specific configuration illustrated in FIG. 2B is merely exemplary, and any number/type of each node may exist in the system 201B.

As noted above, a DU 105A-H may act as (and may be referred to herein as) a "radio controller" for one or more RUs 106 in a 5G C-RAN 100A operating according to O-RAN specifications. Each DU 105 may communicate over its own respective IP address (DUIP1-DUIP8 in FIG. 2B).

Even though the gNBs 100 correspond to different operators 109, both gNBs 100 may be configured to receive uplink signals, and to transmit downlink signals, using some of the same RU instances (C1-C8) 107A-H. As before, each RU 106 may optionally implement more than one RU instance 107 (e.g., modules).

As shown in FIG. 2B, multiple RU instances 107 in a multi-instance RU 106 may initiate a separate connection with the same DU 105 (on a separate ETHERNET port), e.g., each RU instance 107 being configured with a different NETCONF session. For example, the first RU instance (C1) 107A and the second RU instance (C2) 107B in the first RU 106 may each be assigned to (and be configured by) a first DU 105A in a first gNB 100C. Similarly, each of the first three RU instances 107E-G in the second RU 106 may each be assigned to (and be configured by) a first DU 105A in a first gNB 100C.

Alternatively or additionally, multiple RU instances 107 in a multi-instance RU 106 may each initiate a separate connection to different respective DUs 105 in the same gNB 100. For example, the second RU instance (C2) 107B in the first RU 106 may be assigned to (and be configured by) the first DU 105A in the first gNB 100C, while the third RU instance (C3) 107C in the first RU 106 may be assigned to (and be configured by) the second DU 105B in the first gNB 100C.

Alternatively or additionally, multiple RU instances 107 in a multi-instance RU 106 may each initiate a separate connection to different DUs 105 in different respective gNBs 100. For example, the third RU instance (C3) 107C in the first RU 106 may be assigned to (and be configured by) the second DU 105B in the first gNB 100C, while the fourth RU instance (C4) 107D in the first RU 106 may each be assigned to (and be configured by) the first DU 105E in the second gNB 100D.

As will be discussed below, once an RU 106 powers up, it may be configured to discover the DU 105 it is assigned to and be configured by that DU 105 via a NETCONF session. Among other things, the DU 105 may inform the RU 106 how many carriers it will need to support for that DU 105. In other words, the DU 105 may inform the RU 106, during configuration, how many connections the RU 106 will have to maintain with the DU 105, where a different connection from a different RU instance 107 may be established between the DU 105 and RU 106 for each carrier/connection. The DU 105 may signal the number of carriers via M-plane communication and start multiple NETCONF connections with the same RU 106 (if the DU 105 has multiple carriers configured for that RU 106).

First Example Configuration of Radio Controller Discovery in a System

Figure 3A:
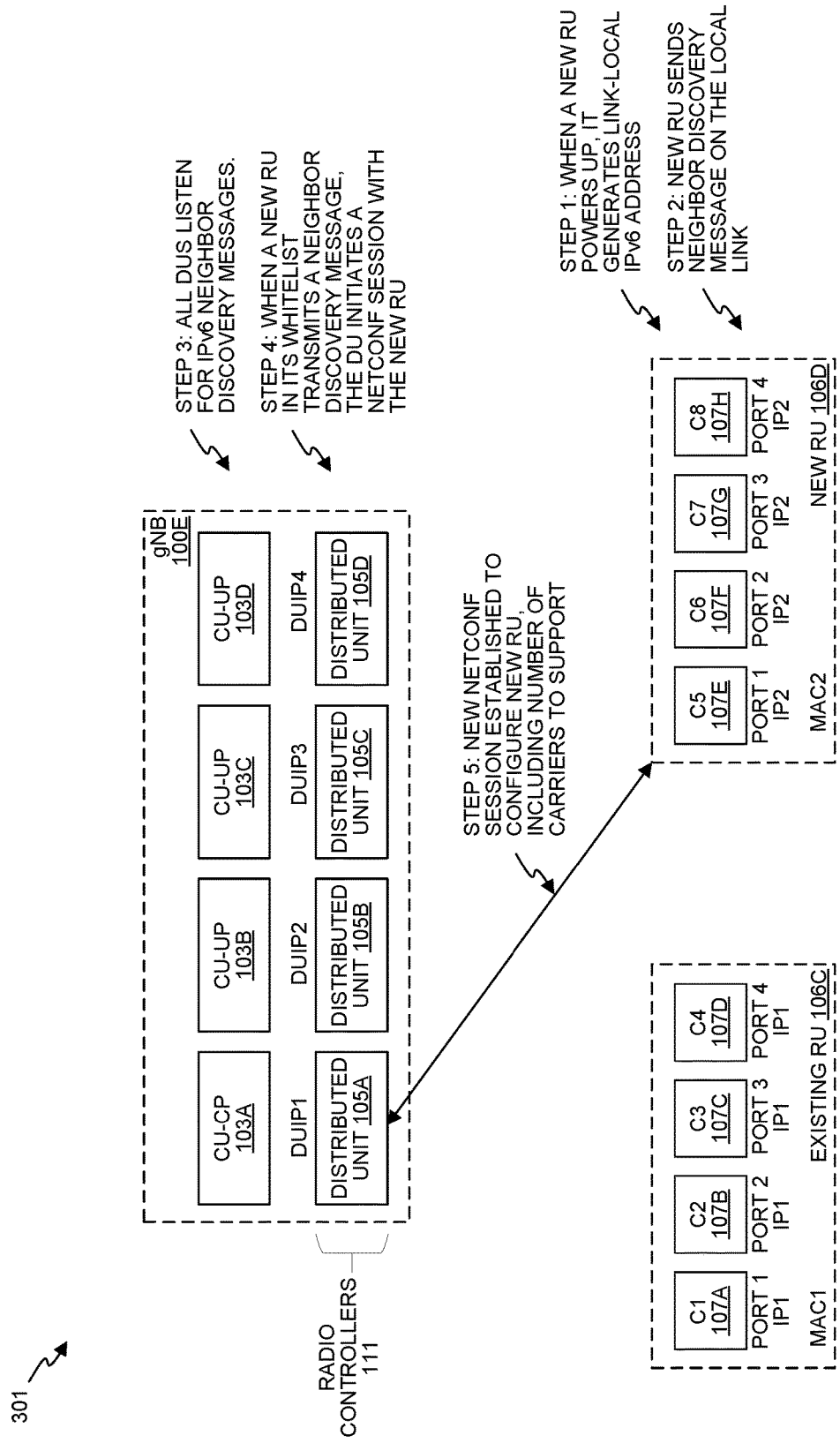
FIG. 3A is a block diagram illustrating the first example configuration of radio controller discovery in a system.

FIG. 3A is a block diagram illustrating the first example configuration of radio controller 111 discovery in a system 301. In the system 301 in FIG. 3A, the gNB 100E is implemented using one or more 5G C-RANs 100, though other configurations are possible, e.g., C-RAN(s) 100 having 4G and/or 5G components. Thus, the radio controllers 111 in the system 301 of FIG. 3A are DUs 105A-D. Additionally, the gNB 100E may include any number of CUs 103 or DUs 105 (or baseband controllers 104 in a 4G C-RAN 100B). Additionally, the system 301 may include more than one gNB 100E, e.g., in a multi-operator system where one or more gNBs 100 are associated with each of the network operators 109.

In the system 301, a new RU 106D is being powered up for the first time and needs to discover its radio controller(s) 111 (e.g., DU(s) 105 that will configure one or more RU instances 107 in the new RU 106D). In the system 301, an existing RU 106C (that has already discovered its radio controller 111) is illustrated, though there could be zero or more than one existing RU 106 at the time the first example configuration is performed, e.g., the new RU 106D may be the first RU 106 powered up in a given C-RAN 100. Furthermore, multiple new RUs 106D may perform radio controller 111 discovery in overlapping, parallel, and/or sequential processes.

The front-haul network 118 in first example configuration (and optionally the second example configuration discussed below) uses the Internet Protocol version 6 (IPv6) network protocol. IPv6 provides several different options to generate an IP address, two of which are discussed herein: a stateless address autoconfiguration mode (where a client on the IPv6 network derives its IP address from its Media Access Control (MAC) address) or a managed mode (where the client contacts a DHCP server for its IP address).

Figure 3B:
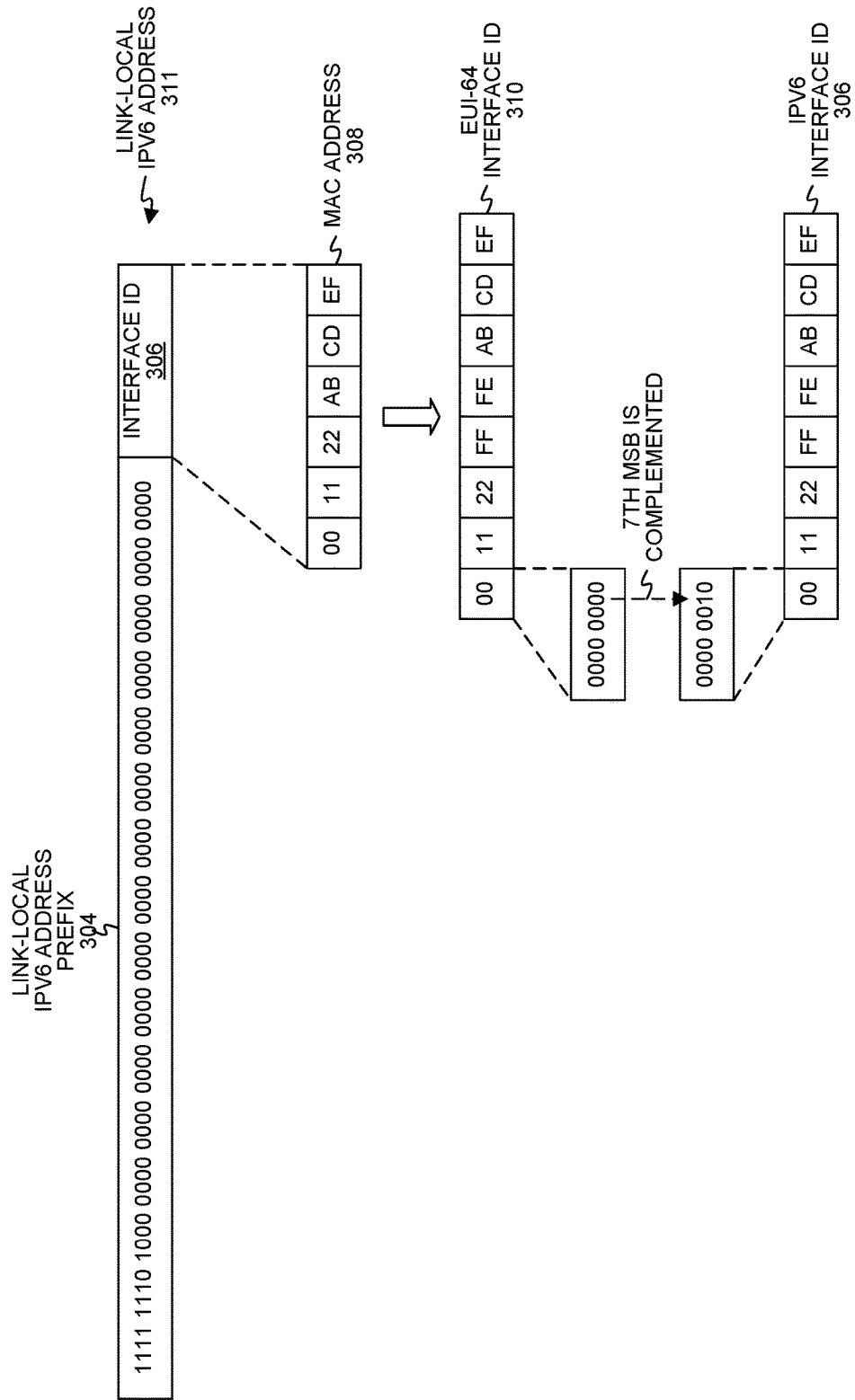
FIG. 3B is a block diagram illustrating different portions of an IPv6 address and how an IPv6 address can be derived from a MAC address.

FIG. 3B is a block diagram illustrating different portions of an IPv6 address and how an IPv6 address can be derived from a MAC address 308. An IPv6 address can be used in two different ways: as a link-local IP address (which a device can use to reach other devices in its link-local network, such as a front-haul network 118, but cannot use to reach devices beyond its link-local network) and as a global IPv6 address (which a device can use to reach other devices beyond its link-local network). As such, a link-local IPv6 address 311 can include two different parts: a link-local IPv6 address prefix 304 and an Interface ID (IID) 306, which is supposed to be unique on the links reached by routing to that prefix, thus giving an IPv6 address that is unique within the applicable scope (link local or global). Specifically, the link-local IPv6 address prefix 304 identifies a network segment (link-local scope or global scope) and the Interface ID (IID) 306 uniquely identifies the host device. This combination of a link-local IPv6 address prefix 304 and an Interface ID (IID) 306 provides the full link-local IPv6 address 311.

To derive an Interface ID (IID) 306 of a device (e.g., an RU 106), the device's MAC address 308 may be extended as follows: (1) 0xFFFE is inserted in between two halves of the device's MAC address 308 (0x001122 and 0xABCDEF in the FIG. 3B example) to produce an EUI-64 Interface ID 310; and (2) the 7th most significant bit (MSB) of the resulting EUI-64 Interface ID 310 is complemented/inverted to produce an Interface ID (IID) 306 for the device. The MAC address 308, EUI-64 Interface ID 310, and Interface ID (IID) 306 are illustrated in hexadecimal in FIG. 3B. The MAC address 308 may be 48 bits long while the EUI-64 Interface ID 310 and Interface ID (IID) 306 are 64 bits long each.

The first example configuration may utilize a stateless address autoconfiguration mode in which the new RU 106D, upon powering up for the first time, initiates radio controller 111 discovery by: (1) determining its IP address (e.g., an IPv6 link-local IP address 311) from its MAC address 308 (as illustrated in FIG. 3B); and (2) sending a discovery message (e.g., discovery packet(s)) to a multicast address on the local link, e.g., a front-haul network 118 (shown in Step 2 in FIG. 3A). For example, the multicast address may be an IPv6-protocol-specified multicast address, e.g., FF02:0:0:0:0:0:0:1 (the DU 105 should be on this all-node multicast address by default), or to a specific predetermined multicast address from the range FF02:0:0:0:0:1:FF00:0000-FF02:0:0:0:0:1:FFFF:FFF. In some examples, each RU 106 sends a single neighbor solicitation, while in other examples an RU 106 may send a respective neighbor solicitation for each RU instance 107 within the RU 106.

Networks using IPv6 addressing implement certain protocol messages for discovering neighboring devices. Neighbor Discovery Protocol is used for discovery devices on the link-local network. They are IPv6 Internet Control Message Protocol (ICMP) version 6 (ICMPv6) type packets and have different types like Router Solicitation (RS), Router Advertisement (RA), Neighbor Solicitation (NS), Neighbor Advertisement (NA), etc. In multicast messaging, the new RU 106D sends messages to a multicast address, which is then sent to devices at other respective addresses. Using IPv6 Neighbor Discovery Protocol (NDP), a device can discover router(s) (using "router solicitation" and "router advertisement" messages) or other device(s) (using "neighbor solicitation" and "neighbor advertisement"), such as radio controllers 111, in the link-local network. When a device (such as the new RU 106D) powers up for the first time on an IPv6 network (such as a front-haul network 118), it can send a multicast neighbor solicitation that is received by neighboring devices on the link-local network. Similarly, when a device comes up new on the IPv6 network, it can send a router solicitation and receive a router advertisement from a router on the link-local network. In some configurations, a header in the neighbor solicitation packet may include a value in a particular field (e.g., a value of 135 in a ICMPv6 packet header) that indicates that the packet includes a neighbor solicitation.

There are at least two options for sending a neighbor solicitation message—directed (where the new RU 106D sends the neighbor solicitation to a specific link-local address) or multicast (where the new RU 106D sends the neighbor solicitation to all devices on the link-local network via a multicast address). By sending the neighbor solicitation to the multicast address, it will be sent to all radio controller(s) (e.g., DU(s) 105A-D) on the link-local network (e.g., on the same front-haul network 118), but only the radio controller 111 to which the new RU 106D is assigned would initiate a NETCONF session in response. Thus, sending the neighbor solicitation by multicast may reduce the amount of retries and traffic in the event that a radio controller 111 doesn't know if the new RU 106D is available and it does multiple retries before signaling that the new RU 106D is not available and stops trying to reach the new RU 106D. In a system 301 with 128 RUs 106 and multiple radio controllers 111, the bandwidth savings can be substantial.

In Step 3 of FIG. 3A, the radio controllers 111 may listen for RU messages through either of the following mechanism: neighbor solicitation (e.g., where the neighbor solicitation is sent to a default multicast address in the link-local network, such as FF02:0:0:0:0:0:1) and multicast messaging (e.g., where the neighbor solicitation is sent to a specific predetermined multicast address from the range FF02:0:0:0:0:1:FF00:0000-FF02:0:0:0:0:1:FFFF:FFF could be chosen as well to send the same message). In neighbor solicitation, the radio controller 111 may respond by directly initiating a NETCONF session (in Step 4 of FIG. 3A), after which the RU 106 will cease sending neighbor solicitation messages. In multicast messaging, the radio controller 111 may respond to a multicast message (not a neighbor solicitation) from the new RU 106D with a unicast message (not a neighbor advertisement) and/or directly initiate a NETCONF session, after which the new RU 106D may cease sending multicast messages.

The radio controllers 111 may determine an RU's IPv6 link-local address from the RU's discovery message (e.g., neighbor solicitation message). Additionally, each radio controller 111 may be configured with a whitelist of MAC addresses 308 for RUs 106 that have joined or may join the C-RAN 100 in the future and are assigned to that particular radio controller 111. Accordingly, each radio controller can compare (1) the sending RU's IP address from the neighbor solicitation with (2) IP addresses derived from MAC addresses 308 in its respective whitelist.

If the link-local IP address 311 (of the new RU 106D that sent the neighbor solicitation message) corresponds to an IP address derived from a MAC address 308 in the radio controller's whitelist, the new RU 106D is assigned to the radio controller 111. Assume in FIG. 3A that the first DU 105A (acting as a radio controller 111) determines that the MAC address 308 of the new RU 106D is in its whitelist. In other words, at least one of the RU instances 107E-H in the new RU 106D is assigned to the first DU 105A in FIG. 3A.

The new RU 106D may then be authenticated and at least one of the RU instances 107E-H in the new RU 106D) configured by the radio controller(s) 111 it is assigned to (the first DU 105A in this case) before the new RU 106D can start providing service to UEs 110. To do this, the radio controller 111 (the first DU 105A) may initiate a configuration session with the new RU 106D. NETCONF is a configuration management protocol that can be used by radio controllers 111 to configure at least one RU instance 107 in RUs 106 (or entire RUs 106 in the case of single-instance RUs 106). NETCONF has its own protocols to initiate a session from either the server side or the client side. Once the NETCONF session(s) have been established, the radio controller 111 (the first DU 105A in FIG. 3A) may send configuration information to the new RU 106D (in Step 5 of FIG. 3A). In examples, an M-plane session is established between the radio controller 111 (the first DU 105A in FIG. 3A) and the new RU 106D using the underlying NETCONF session, where the NETCONF session may use Transport Layer Security (TLS) or Secure Shell (SSH).

Therefore, the first example configuration is more efficient than conventional radio controller 111 discovery in a distributed system because the new RU 106D sends a neighbor solicitation and, in turn, receives a NETCONF session request from the radio controller 111. Since the radio controller 111 (the first DU 105A in FIG. 3A) can quickly determine that the new RU 106D sending the neighbor solicitation is one assigned to it (based on its whitelist and information from the neighbor solicitation), the radio controller 111 can initiate a NETCONF session to start configuring RU instance(s) in the new RU 106D immediately.

In contrast, the O-RAN proposed mechanism proposes only DHCP-based discovery of the Radio Controller by the RU 106, where the RU 106 would get the radio controller's 111 IP address from the DHCP server and then initiate a NETCONF session by using call home.

As described above, each RU 106 may have multiple (e.g., four) RU instances 107, each able to connect to any radio controller 111. Among other things, the radio controller 111 may inform the new RU 106D of its operational parameters, e.g., operating channel(s), Root Sequence Index (RSI), Physical Cell Identity (PCI), operating power, etc.). The number of carriers may be communicated to the new RU 106D outside the NETCONF session in some configurations, e.g., during transmission of DU IP addresses in response to DHCP Vendor Option data request from RU. In that case, the new RU 106 would then initiate the respective number of NETCONF call homes (one for each RU instance 107) or just a single call home and assign the desired number of RU instances 107 to operate with the specific radio controller 111. In some configurations, a single NETFONF session may be used for all RU instances 107 connecting to the same radio controller 111.

Alternatively, a different NETCONF session may be used per RU instance 107 connecting to the same radio controller. Accordingly, in some configurations, the new RU 106D may send information about its ports for the radio controller 111 to establish additional NETCONF sessions or trigger a NETCONF call home to the radio controller 111 to setup additional NETCONF sessions, one each for the number of carriers requested by the radio controller 111. In some configurations where the new RU 106D provides multiple-carrier service for a single radio controller 111, a different respective RU instance 107 on the new RU 106D may implement a different carrier. In examples, each RU instance 107 within the new RU 106D may be implemented as an independent digital instance (e.g., a processing core) on one or more programmable processors in the new RU 106D, e.g., where each programmable processor is a field programmable gate array (FPGA), an application specific integrated circuit (ASIC), a microprocessor, or a digital signal processor (DSP).

Method for Radio Controller Discovery According to First Example Configuration

Figure 4:
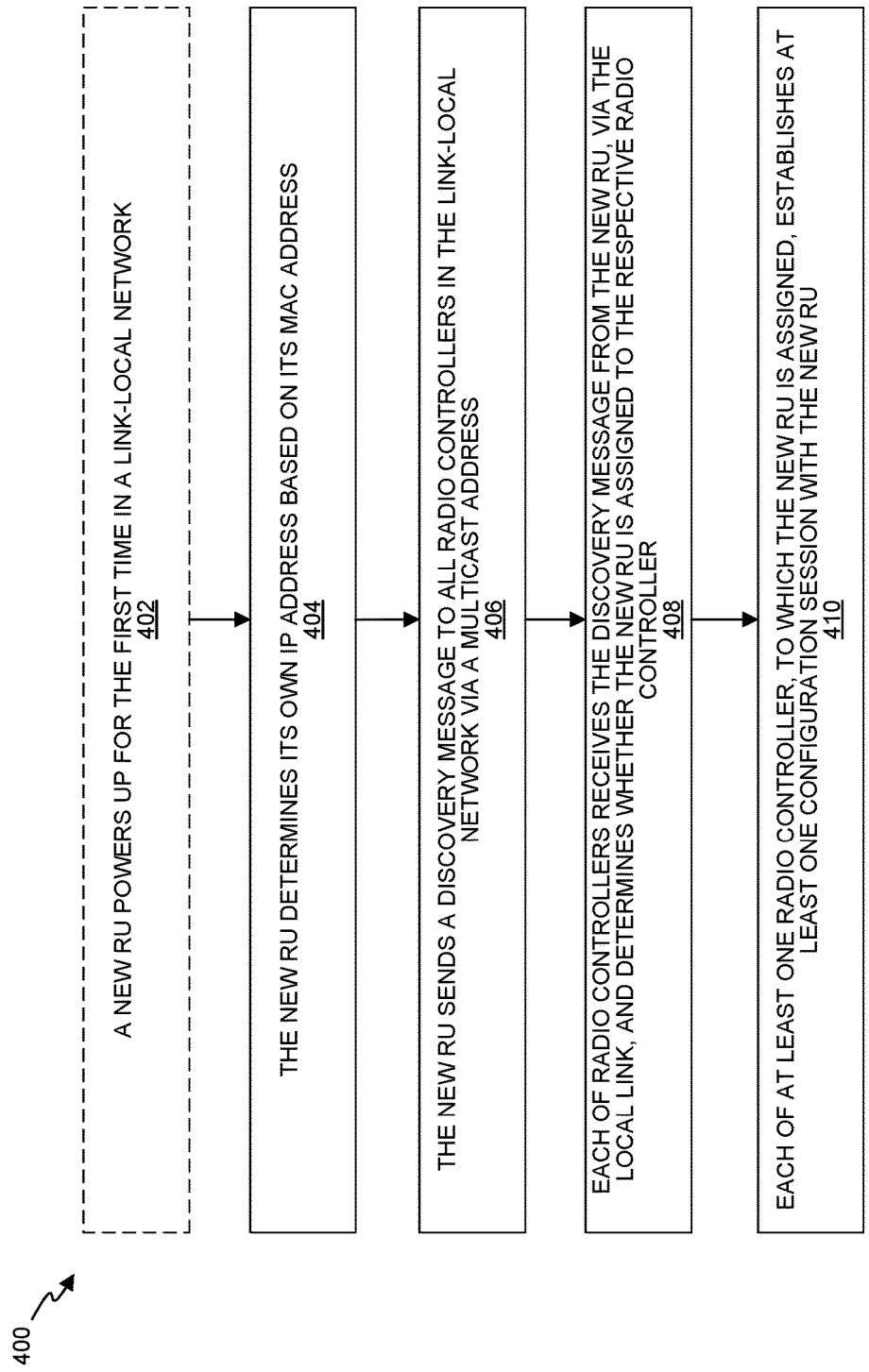
FIG. 4 is a flow diagram illustrating a method for radio controller discovery according to the first example configuration described herein.

FIG. 4 is a flow diagram illustrating a method 400 for radio controller 111 discovery according to the first example configuration described herein. The method 400 may be performed in a system 301 with a C-RAN 100 (implementing 5G gNB(s) and/or 4G eNB(s)) and a new RU 106 joining the C-RAN 100. The radio controller(s) 111 may be DUs 105 or CUs 103 (in 5G configurations) or baseband controllers 104 (in 4G configurations). In some configurations, the system 301 may include multiple gNBs 100 and/or eNBs 100 (e.g., each controlled by a different network operator 109); multiple new RUs 106D joining the C-RAN(s) 100 (each performing the method 400 sequentially and/or in parallel with other new RUs 106D); and/or multiple existing RUs 106C that have previously joined the C-RAN(s) 100. Each of the devices in the system 301 may perform its respective steps using at least one respective processor that executes instructions stored in at least one respective memory.

In some examples, the front-haul 118 of the C-RAN 100 utilizes Internet Protocol version 6 (IPv6) network protocol. The new RU 106D (and other RUs 106 in the system 301) may optionally implement more than one RU instance 107 (e.g., modules). In some configurations, different respective RU instances 107 on the new RU 106D may implement different carriers. In examples, each RU instance 107 within the new RU 106D may be implemented as an independent digital instance (e.g., a processing core) on one or more programmable processors in the new RU 106D, e.g., where each programmable processor is a field programmable gate array (FPGA), an application specific integrated circuit (ASIC), a microprocessor, or a digital signal processor (DSP).

Additionally, the blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method begins at optional step 402 where the new RU 106D powers up for the first time in a link-local network (such as a front-haul network 118). Generally, but without limitation, the new RU 106 would power up after being physically connected to a front-haul network 118 of a C-RAN 100. Optional step 402 may be performed as part of initial deployment of one or more RUs 106 or following maintenance, upgrade, or repair of the new RU 106D. Upon powering up, the new RU 106D may have access to its MAC address 308, but need to determine its own IP address and discover radio controller(s) 111 it is assigned to (e.g., DU(s) 105 that will configure one or more RU instances 107 in the new RU 106D).

Accordingly, the method 400 proceeds at step 404 where the new RU 106D determines its own IP address (e.g., a IPv6 link-local address within the front-haul network 118) based on its MAC address 308. For example, the new RU 106D can autonomously determine its own IP address from its MAC address 308 (as described in FIG. 3B) without a need for a DHCP server.

The method 400 proceeds at step 406 where the new RU 106D sends a discovery message (e.g., discovery packet(s)) to all radio controllers 111 on the local link (e.g., a front-haul network 118) via a multicast address. In some configurations, the discovery message(s) is/are IPv6 neighbor solicitation message(s), which are received by all radio controllers 111 on the same local link (e.g., the same front-haul network 118) via the multicast address. In some examples, the multicast address may be pre-stored on the new RU 106D. In some examples, the new RU 106D may send (to the multicast address) a separate discovery message from each RU instance 107E-H that it implements.

The method proceeds at step 408 where each of the radio controllers 111 on the local link (e.g., the front-haul network 118) receives the discovery message from the new RU 106D, via the link-local network, and determines whether the new RU 106D is assigned to the respective radio controller 111. The radio controllers 111 may determine the RU's IPv6 link-local address from the new RU's discovery message (e.g., neighbor solicitation message). Additionally, each radio controller 111 may be configured with a whitelist of MAC addresses 308 for RUs 106 that have joined or may join the C-RAN 100 in the future and are assigned to that particular radio controller 111. Accordingly, each radio controller can compare (1) the sending RU's IP address from the neighbor solicitation with (2) the IP addresses derived from MAC addresses 308 in its respective whitelist. If the link-local IP address 311 (of the new RU 106D that sent the neighbor solicitation message) corresponds to an IP address derived from a MAC address 308 in the radio controller's whitelist, the new RU 106D is assigned to the radio controller 111.

The method 400 proceeds at step 410 where each of at least one radio controller 111, to which the new RU 106D is assigned, establishes at least one configuration session with the new RU 106D, e.g., only in response to determining that the link-local IP address (of the new RU 106D that sent the neighbor solicitation message) corresponds to an IP address derived from a MAC address in the respective radio controller's whitelist. For example, the configuration session(s) may be NETCONF session(s).

In some examples, the radio controller(s) 111 to which the new RU 106D is assigned may respond to the new RU's 106D neighbor solicitation by initiating a NETCONF session, after which the RU 106 will cease sending multicast neighbor solicitation messages. Alternatively, the radio controller(s) 111 to which the new RU 106D is assigned may respond to the new RU's 106D multicast message (not a neighbor solicitation) from the new RU 106D by sending a unicast message (not a neighbor advertisement) and/or directly initiate a NETCONF session, after which the new RU 106D will cease sending multicast neighbor solicitation messages. In examples, an M-plane session is established between the radio controller 111 and the new RU 106D using the underlying NETCONF session, e.g., where the NETCONF session may use Transport Layer Security (TLS) or Secure Shell (SSH).

Each radio controller 111, to which the new RU 106D is assigned, may then configure the new RU 106D for operation via the respective at least one configuration session. This may include each radio controller 111, to which the new RU 106D is assigned, indicating to the new RU 106D the number of carriers it needs to support for the respective radio controller 111. For example, if the new RU 106D has multiple (e.g., four) RU instances 107, each may be able to connect to any radio controller 111. Additionally, the new RU 106D may send information about its ports for the radio controller 111 to establish additional NETCONF sessions or trigger a NETCONF call home to the radio controller 111 to setup additional NETCONF sessions, one each for the number of carriers requested by the radio controller 111. For example, different RU instances 107 in the new RU 106D could connect to the same radio controller 111 or different radio controllers 111 (and optionally different radio controllers 111 belonging to different network operators 109).

Second Example Configuration of Radio Controller Discovery in a System

Figure 5:
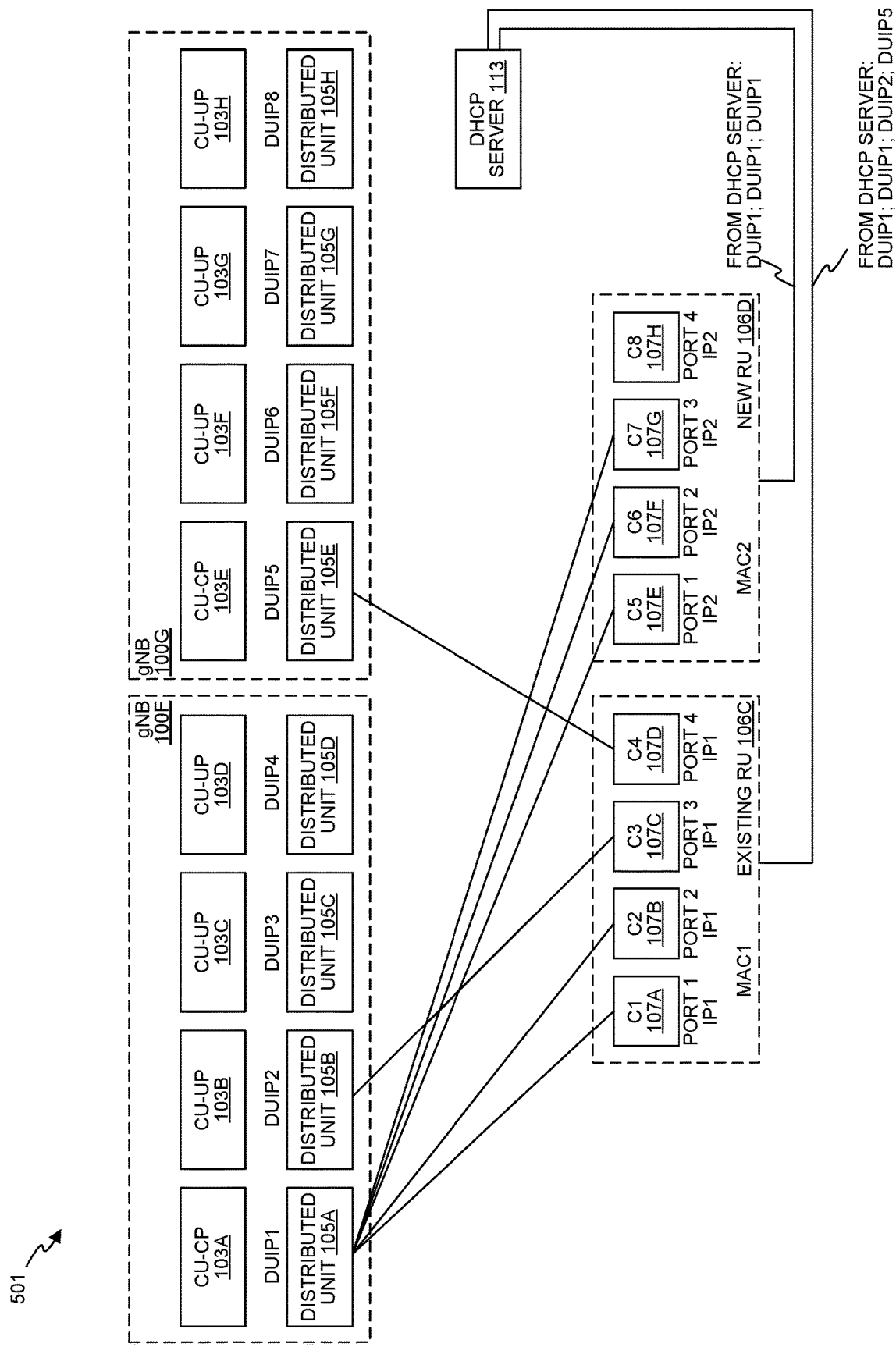
FIG. 5 is a block diagram illustrating the second example configuration of radio controller discovery in a system.

FIG. 5 is a block diagram illustrating the second example configuration of radio controller 111 discovery in a system 501. In the system 501 of FIG. 5, at least two gNBs 100F-G are implemented using one or more 5G C-RANs 100, though other configurations are possible, e.g., C-RAN(s) 100 having 4G and/or 5G components. For example, each gNB 100F-G may be operated by a different network operator 109. Additionally, the gNBs 100F-G may include any number of CUs 103 or DUs 105 (or baseband controllers 104 in a 4G C-RAN(s) 100B).

In the system 501, a new RU 106D is being powered up for the first time and needs to discover its radio controller(s) 111 (e.g., DU(s) 105 that will configure one or more RU instances 107E-H in new RU 106D). In the system 501, an existing RU 106C (that has already discovered its radio controller 111) is illustrated, though there could be zero or more than one existing RU 106 at the time the first example configuration is performed, e.g., the new RU 106D may be the first RU 106 powered up in a given C-RAN 100. Furthermore, multiple new RUs 106D may perform radio controller 111 discovery in parallel processes.

As noted above, one O-RAN proposal is for the new RU 106D to contact a Dynamic Host Configuration Protocol (DHCP) server 113 after power up, after which the DHCP server 113 assigns new RU 106D an IP address and also sends the IP address of its radio controller 111 (DU 105 in FIG. 5) to the new RU 106D. There is at least one possible problem with this O-RAN proposal in systems 501 using multi-carrier RUs 106. Specifically, this O-RAN proposal would limit communication to one radio controller 111 and one RU 106 because the DHCP server sends back to the RU 106 (in a vendor field) a single radio controller 111 IP address and a single RU 106 IP address. But if the new RU 106D is capable of initiating connections with multiple radio controllers 111 (DUs 105 in FIG. 5), the O-RAN proposal would effectively leave this functionality unused.

Instead of the O-RAN proposal, the second example configuration described herein utilizes DHCP server(s) 113 that is/are capable of sending back IP addresses for multiple radio controllers 111 in the DHCP server's response to the new RU 106D. If the radio controller 111 and new RU 106D are both capable of initiating multiple connections to each other, the radio controller's 111 IP address may be listed twice in the DHCP server's response to the new RU 106D, once for each carrier. Accordingly, when the new RU 106D gets this response from the DHCP server, it knows how many connections to each radio controller 111 (DU in FIG. 5) it needs to entertain/establish, one per carrier.

As before, each radio controller 111 (DU 105 in FIG. 5) may communicate over its own respective IP address (DUIP1-DUIP8 in FIG. 5), while each RU instance 107E-H in the new RU 106D may use the same IP address (IP2) and MAC address 308 (MAC2) but different logical Ethernet ports (as shown in FIG. 5). The DHCP server 113 may be configured (e.g., configured/updated during operation) with a list of RU MAC addresses 308 and the IP address(es) of the radio controller(s) 111 (DU(s) 105 in FIG. 5) they are assigned to. In configurations with multiple DHCP servers 113 (not shown), each DHCP server 113 may have a range of IP addresses allocated to it, e.g., a first range of IP addresses allocated to the first DHCP server 113 may be non-overlapping with a second range of IP addresses allocated to the second DHCP server 113.

Upon powering up for the first time in the local link (e.g., a front-haul network 118), the new RU 106D may determine an IP address (e.g., an IPv6 link-local IP address 311) for itself from its MAC address 308 (the MAC address 308 of the new RU 106D would be MAC2 in FIG. 5).

In some configurations, the new RU(s) 106D each perform a discovery process (e.g., after receiving a router advertisement (RA) on the link-local network). The discovery process can include the new RU(s) 106D each sending a solicit message and receiving a DHCP server 113 response, with information to connect to radio controller(s) 111. The new RU 106D can then receive the IP address(es) of the radio controller(s) 111 (DU(s) 105 in FIG. 5) it needs to connect to the radio controller(s) 111. For example, the new RU(s) 106D can request Vendor Specific data (encapsulated in Option 17 message) from the DHCP server 113, which will contain the DU IP addresses. The DHCP server 113 may validate the new RU(s) 106D and then provide the new RU(s) 106D with the Vendor Specific Data containing the DU IP addresses, in the Option 17 packet.

The DHCP response will also indicate the number of carriers the radio controller 111 (DU 105 in FIG. 5) needs the new RU 106D to establish. For example, the new RU 106D may receive, from the DHCP server 113, a response indicating 'RU MAC2: DUIP1; DUIP1; DUIP1' (or 'RU MAC2: DUIP1:3') because the new RU 106D needs to establish three different connections to the first DU 105A in the first gNB 100C (DUIP1 is listed three times to indicate three different carriers for the first DU 105A in the first gNB 100C). In contrast, when the existing RU 106C previously performed radio controller discovery, it may have received (1) from the DHCP server 113, a response indicating 'RU MAC1: DUIP1; DUIP1; DUIP2; DUIP5' (or 'RU MAC1: DUIP1:2; DUIP2; DUIP5') because the existing RU 106C needs to establish two connections to the first DU 105A, one connection to the second DU 105B in the first gNB 100C; and one connection to the first DU 105E in the second gNB 100D.

Alternatively, in a system 501 with multiple DHCP servers 113 (not shown), an RU 106 that needs to make connections with radio controllers 111 in two different gNBs 100C-D may receive a DHCP response from each multiple different DHCP servers 113, e.g., where each DHCP server 113 serves a different gNB 100C-D. For example, the new RU 106D in FIG. 5 may receive, from the first DHCP server 113A (that serves the first gNB 100C), a response indicating 'RU MAC2: DUIP1; DUIP1; DUIP1' (or 'RU MAC2: DUIP1:3') because the new RU 106D needs to establish three different connections to the first DU 105A in the first gNB 100C (DUIP1 is listed three times to indicate three different carriers for the first DU 105A in the first gNB 100C). In contrast, the existing RU 106C performed radio controller discovery, it may have received (1) from the first DHCP server 113A, a response indicating 'RU MAC1: DUIP1; DUIP1; DUIP2' (or 'RU MAC1: DUIP1:2; DUIP2') because the existing RU 106C needs to establish two connections to the first DU 105A and one connection to the second DU 105B in the first gNB 100C; and (2) from the second DHCP server 113B (that serves the second gNB 100D), a response indicating 'RU MAC1: DUIP5' because the existing RU 106C needs to establish a connection to the first DU 105E in the second gNB 100D.

The new RU 106D may then initiate a different configuration session for each carrier it needs to establish with each radio controller 111 (DU 105 in FIG. 5) it is assigned to. For example, the new RU 106D may initiate three different NETCONF sessions the first DU 105A in the first gNB 100C (using DUIP1), one NETCONF session for each of the carriers the new RU 106D needs to establish. Once the NETCONF session has been established, the first DU 105A may send configuration information to the new RU 106D. In examples, an M-plane session is established between the radio controller 111 and the new RU 106D using the underlying NETCONF session, e.g., where the NETCONF session may use Transport Layer Security (TLS) or Secure Shell (SSH).

As noted earlier, the O-RAN proposal does not account for how a multi-carrier RP in a distributed RAN (ORAN framework) could be deployed in multi-operator cases. Accordingly, the second example configuration of radio controller discover enables multi-carrier RUs 106 in multi-operator systems 501.

Method for Radio Controller Discovery According to Second Example Configuration

Figure 6:
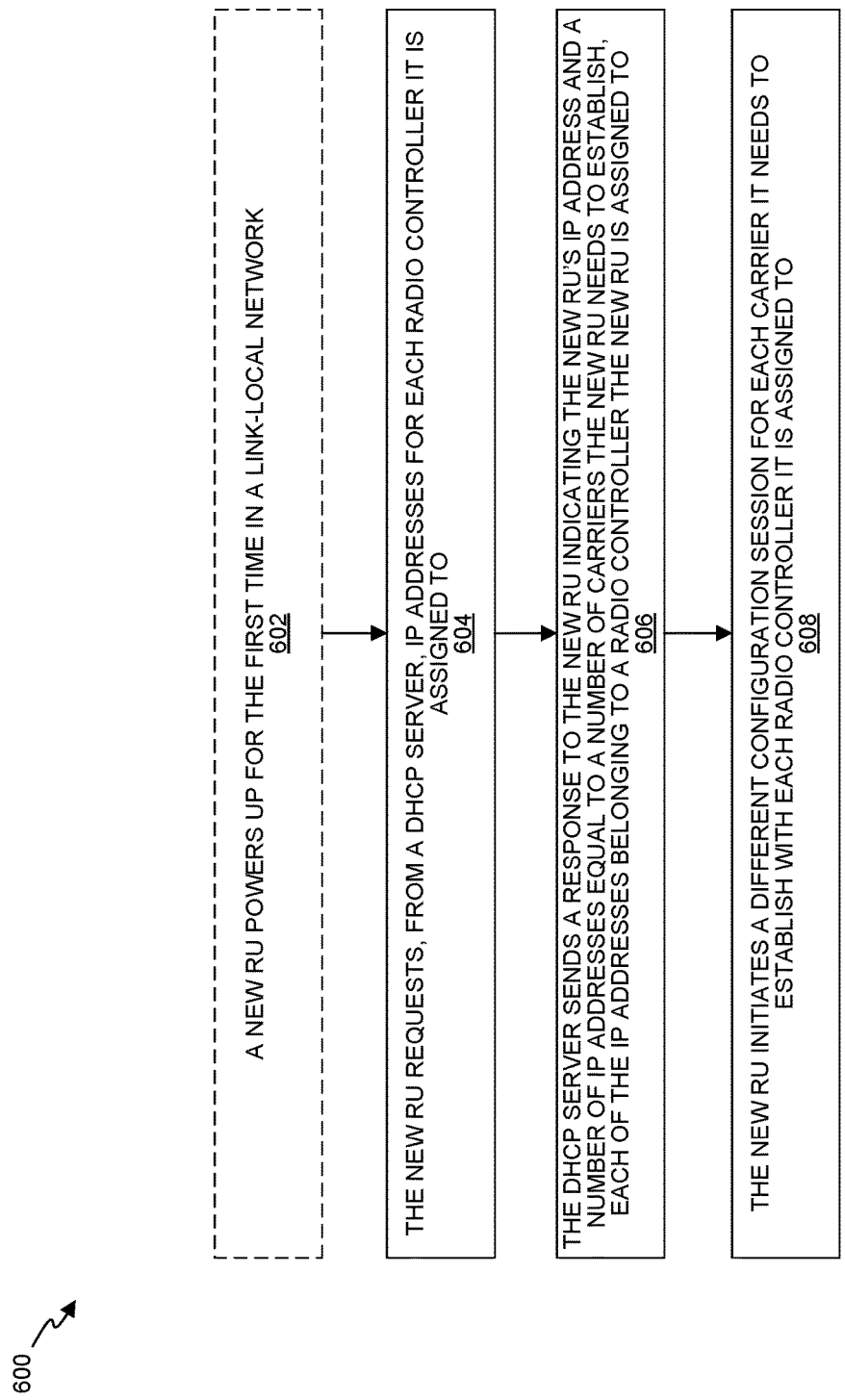
FIG. 6 is a flow diagram illustrating a method for radio controller discovery according to the second example configuration described herein.

FIG. 6 is a flow diagram illustrating a method 600 for radio controller 111 discovery according to the second example configuration described herein. The method 600 may be performed in a system 501 with a C-RAN 100 (implementing 5G gNB(s) and/or 4G eNB(s)) and a new RU 106 joining the C-RAN 100. The radio controller(s) 111 may be DUs 105 or CUs 103 (in 5G configurations) or baseband controllers 104 (in 4G configurations). In some configurations, the system 501 may include multiple gNBs 100 and/or eNBs 100 (e.g., where each is controlled by a different network operator 109); multiple new RUs 106D joining the C-RAN(s) 100 (each performing the method 600 sequentially and/or in parallel with other new RUs 106D); and/or less than or more than one existing RU 106C that has/have previously joined the C-RAN(s) 100. Each of the devices in the system 501 may perform its respective steps using at least one respective processor that executes instructions stored in at least one respective memory. In some examples, the front-haul 118 of each C-RAN 100 (e.g., gNB 100C-D or eNB) utilizes Internet Protocol version 6 (IPv6) network protocol.

The system 501 may also include at least one Dynamic Host Configuration Protocol (DHCP) server 113, each of which are configured with a list of MAC addresses 308 for RU(s) 106 in the system and a list of IP address(es) of the radio controller(s) 111 each of the RU(s) 106 is assigned to.

The new RU 106D (and any existing RUs 106C in the system 501) may optionally implement more than one RU instance 107 (e.g., modules). In some configurations, different respective RU instances 107 on the new RU 106D may implement different carriers. For example: (1) multiple RU instances 107 may support the same carrier; (2) one RU instance 107 may support multiple carriers; and/or (3) one RU instance 107 (e.g., in a multi-instance RU 106) supports multiple carriers.

In some cases, the new RU 106D may establish multiple carriers for a single radio controller 111 to which it is assigned. In some configurations, each RU instance 107 within the new RU 106D may be implemented as an independent digital instance (e.g., a processing core) on one or more programmable processors in the new RU 106D, e.g., where each programmable processor is a field programmable gate array (FPGA), an application specific integrated circuit (ASIC), a microprocessor, or a digital signal processor (DSP).

Each radio controller 111 (DU 105 in the system 501) may communicate over its own respective IP address (DUIP1-DUIP8 in the system 501), while each RU instance 107E-H in the new RU 106D may use the same IP address (IP2) and MAC address 308 (MAC2) but different logical Ethernet port as shown in the system 501. Additionally, the DHCP server 113 (in the same link-local network, e.g., fronthaul network 118) may have a range of IP addresses allocated to it, e.g., a first range of IP addresses allocated to the first DHCP server 113A may be non-overlapping with a second range of IP addresses allocated to the second DHCP server 113B.

Additionally, the blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

The method begins at step 602 where the new RU 106D powers up for the first time in a link-local network (such as a front-haul network 118, for example). Generally, but without limitation, the new RU 106 would power up after (or shortly before) being physically connected to a front-haul network 118 of a C-RAN 100. Step 602 may be performed as part of initial deployment of one or more RUs 106 or following maintenance, upgrade, or repair of the new RU 106D. Upon powering up, the new RU 106D may have access to its MAC address 308, but needs to determine its own IP address and discover radio controller(s) 111 it is assigned to (e.g., DU(s) 105 that will configure one or more RU instances 107 in the new RU 106D).

The method 600 proceeds at step 604 where the new RU 106D requests, from the DHCP server 113, IP address(es) for each radio controller 111 (e.g., DU 105) it is assigned to. In some configurations, the new RU 106D performs a discovery process to establish a connection to the DHCP server 113, as described above. Examples herein describe the DHCP server 113 operating in a link-local IP address environment, though the DHCP server 113 could alternatively send a global IP address of the radio controller(s) 111. Alternatively, the new RU(s) 106D are pre-configured with radio controller's IP address (e.g., an IPv6 link-local IP address 311).

The method 600 proceeds at step 606 where the DHCP server 113 sends a response to the new RU 106D indicating a number of IP addresses equal to a number of carriers the new RU 106D needs to establish, each of the IP addresses belonging to a radio controller 111 the new RU 106D is assigned to.

The DHCP response may list/indicate the new RU's MAC address 308 and one or more radio controller IP addresses that the new RU 106D needs to initiate Netconf connection with. If the new RU 106D is to establish N (N>=1) carriers for a particular radio controller 111, the particular radio controller's IP address may be listed N times, e.g., a DHCP response similar to 'RU MAC2: DUIP1; DUIP1; DUIP1' (or 'RU MAC2: DUIP1:3') may indicate that the new RU 106D (with a MAC address 308 of MAC2) needs to establish three different connections to the radio controller 111 with an IP address of DUIP1 (the first DU 105A in the first gNB 100C in the system 501).

In some scenarios, an RU 106 (such as the existing RU 106C) needs to establish carriers for radio controllers 111 associated with different network operators. During radio controller discovery, the existing RU 106C can request and receive Vendor Specific data (encapsulated in Option 17 message) from the DHCP server 113. For example, the existing RU 106C may receive a single response from a single DHCP server 113 indicating the number of carriers and associated IP addresses for the associated radio controllers 111 even though different radio controllers 111 in the list may be associated with different network operators 109, e.g., the existing RU 106C in the system 501 may receive a single DHCP response of 'RU MAC1: DUIP1; DUIP1; DUIP2; DUIP5', 'RU MAC1: DUIP1:2; DUIP2; DUIP5', or similar.

Alternatively, the new RU 106D may receive separate DHCP responses, each associated with a network operator that controls at least one radio controller 111 to which the new RU 106D is assigned. For example, with reference to FIG. 5, the existing RU 106C would receive (during radio controller 111 discovery): (1) a first DHCP response indicating 'RU MAC1: DUIP1; DUIP1; DUIP2' (because the existing RU 106C needed to establish two connections to the first DU 105A and one connection to the second DU 105B in the first gNB 100C; and (2) a second DHCP response indicating 'RU MAC1: DUIP5' because the existing RU 106C needed to establish a connection to the first DU 105E in the second gNB 100D.

In some configurations, the DHCP server 113 also sends the new RU's IP address (e.g., IPv6 address) in the response. For example, the DHCP server 113 can allocate an IP address for the new RU 106D only in response to successfully validating the new RU's MAC address. Alternatively, the new RU 106D may determine its own IP address from its MAC address, e.g., as described in FIG. 3B.

The method 600 proceeds to step 608 where the new RU 106D initiates a different configuration session for each carrier it needs to establish with each radio controller 111 it is assigned to. For example, the new RU 106D may initiate multiple different NETCONF sessions with a particular radio controller 111, one NETCONF session for each of the carriers the new RU 105D needs to establish with the particular radio controller 111. Once the NETCONF session has been established with a radio controller 111, the radio controller 111 may send configuration information to the new RU 106D. In examples, an M-plane session is established between the radio controller 111 and the new RU 106D using the underlying NETCONF session, e.g., where the NETCONF session may use Transport Layer Security (TLS) or Secure Shell (SSH).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database, or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for discovering a radio controller in a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a distributed radio access network (RAN), comprising: a new radio unit (RU) being connected to a front-haul network and configured to: determine its own Internet Protocol (IP) address based on its Media Access Control (MAC) address; send a discovery message to all radio controllers in the front-haul network via a multicast address; and a plurality of radio controllers communicatively coupled to the new RU via the front-haul network, wherein each of the plurality of radio controllers are configured to receive the discovery message and determine whether the new RU is assigned to the respective radio controller; wherein each of at least one radio controller, to which the new RU is assigned, establishes at least one configuration session with the new RU.

Example 2 includes the distributed RAN of Example 1, wherein the discovery message is a multicast Internet Protocol version 6 (IPv6) neighbor solicitation message.

Example 3 includes the distributed RAN of any of Examples 1-2, wherein each of the plurality of radio controllers is configured to determine whether the new RU is assigned to the respective radio controller by determining whether a link-local IP address of the new RU corresponds to an IP address derived from a MAC address in a whitelist stored in the respective radio controller.

Example 4 includes the distributed RAN of any of Examples 1-3, wherein each configuration session is a Network Configuration Protocol (NETCONF) session that configures the new RU to be operational in the distributed RAN.

Example 5 includes the distributed RAN of any of Examples 1-4, wherein each of the at least one radio controller, to which the new RU is assigned, uses at least one NETCONF session to indicate a number of carriers that the new RU needs to establish for the respective radio controller.

Example 6 includes the distributed RAN of any of Examples 1-5, wherein the new RU implements multiple RU instances in a single physical housing; wherein each RU instance in the new RU utilizes a separate logical Ethernet port on the new RU; and wherein each RU instance in the new RU shares a same physical Ethernet port and Media Access Control (MAC) address.

Example 7 includes the distributed RAN of Example 6, wherein each of the multiple RU instances establishes a different carrier for a same one of the at least one radio controller to which the new RU is assigned.

Example 8 includes the distributed RAN of any of Examples 6-7, wherein more than one of the multiple RU instances establishes a same carrier for a same one of the at least one radio controller to which the new RU is assigned.

Example 9 includes the distributed RAN of any of Examples 6-8, wherein one RU instance in a multiple-instance RU establishes multiple carriers for a same one of the at least one radio controller to which the new RU is assigned.

Example 10 includes the distributed RAN of any of Examples 1-9, wherein the radio controllers are implemented in Third Generation Partnership Project Fifth Generation (5G) Central Units or Distributed Units, Third Generation Partnership Project Long Term Evolution (LTE) baseband controllers, or a head unit in a Distributed Antenna System (DAS).

Example 11 includes a method for radio controller discovery performed in a distributed radio access network (RAN), comprising: determining, at a new RU, its own Internet Protocol (IP) address based on its Media Access Control (MAC) address; sending, from the new RU, a discovery message to all radio controllers in a front-haul network via a multicast address; receiving, at each of a plurality of radio controllers communicatively coupled to the new RU via the front-haul network, the discovery message and determining whether the new RU is assigned to the respective radio controller; and establishing at least one configuration session with the new RU.

Example 12 includes the method of Example 11, wherein the discovery message is a multicast Internet Protocol version 6 (IPv6) neighbor solicitation message.

Example 13 includes the method of any of Examples 11-12, further comprising determining, at each of the plurality of radio controllers, whether the new RU is assigned to the respective radio controller by determining whether a link-local IP address of the new RU corresponds to an IP address derived from a MAC address in a whitelist stored in the respective radio controller.

Example 14 includes the method of any of Examples 11-13, wherein each configuration session is a Network Configuration Protocol (NETCONF) session that configures the new RU to be operational in the distributed RAN.

Example 15 includes the method of any of Examples 11-14, wherein each of the at least one radio controller, to which the new RU is assigned, uses at least one NETCONF session to indicate a number of carriers that the new RU needs to establish for the respective radio controller.

Example 16 includes the method of any of Examples 11-15, wherein the new RU implements multiple RU instances in a single physical housing; wherein each RU instance in the new RU utilizes a separate logical Ethernet port on the new RU; and wherein each RU instance in the new RU shares a same physical Ethernet port and Media Access Control (MAC) address.

Example 17 includes the method of Example 16, wherein each of the multiple RU instances establishes a different carrier for a same one of the at least one radio controller to which the new RU is assigned.

Example 18 includes the method of any of Examples 16-17, wherein more than one of the multiple RU instances establishes a same carrier for a same one of the at least one radio controller to which the new RU is assigned.

Example 19 includes the method of any of Examples 16-18, wherein one RU instance in a multiple-instance RU establishes multiple carriers for a same one of the at least one radio controller to which the new RU is assigned.

Example 20 includes the method of any of Examples 11-19, wherein the radio controllers are implemented in Third Generation Partnership Project Fifth Generation (5G) Central Units or Distributed Units, Third Generation Partnership Project Long Term Evolution (LTE) baseband controllers, or a head unit in a Distributed Antenna System (DAS).

Example 21 includes a distributed radio access network (RAN), comprising: a new radio unit (RU) being connected to a plurality of radio controllers via a front-haul network and configured to request, from a Dynamic Host Configuration Protocol (DHCP) server after the new RU powers up a first time, IP addresses for each radio controller it is assigned to; and the DHCP server configured to send a response to the new RU indicating a number of Internet Protocol (IP) addresses equal to a number of carriers the new RU needs to establish, each of the IP addresses belonging to a radio controller the new RU is assigned to; wherein the new RU initiates a different configuration session for each carrier it needs to establish with each radio controller it is assigned to.

Example 22 includes the distributed RAN of Example 21, wherein the response from the DHCP server also indicates the new RU's Internet Protocol (IP) address.

Example 23 includes the distributed RAN of any of Examples 21-22, wherein the new RU determines its own Internet Protocol (IP) address based on its Media Access Control (MAC) address.

Example 24 includes the distributed RAN of any of Examples 21-23, wherein the IP addresses are Internet Protocol version 6 (IPv6), Internet Protocol version 4 (IPv4) addresses, or a combination of both.

Example 25 includes the distributed RAN of any of Examples 21-24, wherein each configuration session is a Network Configuration Protocol (NETCONF) session that configures the new RU to be operational in the distributed RAN.

Example 26 includes the distributed RAN of any of Examples 21-25, wherein the response from the DHCP server indicates a number of carriers that the new RU needs to establish with each radio controller to which it is assigned.

Example 27 includes the distributed RAN of any of Examples 21-26, wherein the new RU implements multiple RU instances in a single physical housing; wherein each RU instance in the new RU utilizes a separate logical Ethernet port on the new RU; and wherein each RU instance in the new RU shares a same physical Ethernet port and Media Access Control (MAC) address.

Example 28 includes the distributed RAN of Example 27, further comprising establishing, at each of the multiple RU instances, a different carrier for a same radio controller to which the new RU is assigned.

Example 29 includes the distributed RAN of any of Examples 27-28, wherein each RU instance is configured using a separate configuration session.

Example 30 includes the distributed RAN of any of Examples 28-29, wherein the response indicates IP addresses for radio controllers associated with different network operators.

Example 31 includes a method for radio controller discovery performed in a distributed radio access network (RAN), comprising: requesting, from a Dynamic Host Configuration Protocol (DHCP) server after a new radio unit (RU) powers up a first time in a front-haul network, IP addresses for each radio controller the new RU is assigned to; sending, from the DHCP server, a response to the new RU indicating a number of Internet Protocol (IP) addresses equal to a number of carriers the new RU needs to establish, each of the IP addresses belonging to a radio controller the new RU is assigned to; and initiating, by the new RU, a different configuration session for each carrier it needs to establish with each radio controller it is assigned to.

Example 32 includes the method of Example 31, wherein the response from the DHCP server also indicates the new RU's Internet Protocol (IP) address.

Example 33 includes the method of any of Examples 31-32, wherein the new RU determines its own Internet Protocol (IP) address based on its Media Access Control (MAC) address.

Example 34 includes the method of any of Examples 31-33, wherein the IP addresses are Internet Protocol version 6 (IPv6), Internet Protocol version 4 (IPv4) addresses, or a combination of both.

Example 35 includes the method of any of Examples 31-34, wherein each configuration session is a Network Configuration Protocol (NETCONF) session that configures the new RU to be operational in the distributed RAN.

Example 36 includes the method of any of Examples 31-35, wherein the response from the DHCP server indicates a number of carriers that the new RU needs to establish with each radio controller to which it is assigned.

Example 37 includes the method of any of Examples 31-36, wherein the new RU implements multiple RU instances in a single physical housing; wherein each RU instance in the new RU utilizes a separate logical Ethernet port on the new RU; and wherein each RU instance in the new RU shares a same physical Ethernet port and Media Access Control (MAC) address.

Example 38 includes the method of Example 37, further comprising establishing, at each of the multiple RU instances, a different carrier for a same radio controller to which the new RU is assigned.

Example 39 includes the method of any of Examples 37-38, further comprising configuring each RU instance using a separate configuration session.

Example 40 includes the method of any of Examples 31-39, wherein the response indicates IP addresses for radio controllers associated with different network operators.

The invention claimed is:

1. A distributed radio access network (RAN), comprising:
a new radio unit (RU) being connected to a front-haul network and configured to:
determine its own Internet Protocol (IP) address based on its Media Access Control (MAC) address;
send a discovery message to all radio controllers in the front-haul network via a multicast address; and
a plurality of radio controllers communicatively coupled to the new RU via the front-haul network, wherein each of the plurality of radio controllers are configured to receive the discovery message and determine whether the new RU is assigned to the respective radio controller;
wherein each of at least one radio controller, to which the new RU is assigned, establishes at least one configuration session with the new RU.

2. The distributed RAN of claim 1, wherein the discovery message is a multicast Internet Protocol version 6 (IPv6) neighbor solicitation message.

3. The distributed RAN of claim 1, wherein each of the plurality of radio controllers is configured to determine whether the new RU is assigned to the respective radio controller by determining whether a link-local IP address of the new RU corresponds to an IP address derived from a MAC address in a whitelist stored in the respective radio controller.

4. The distributed RAN of claim 1, wherein each configuration session is a Network Configuration Protocol (NETCONF) session that configures the new RU to be operational in the distributed RAN.

5. The distributed RAN of claim 1, wherein each of the at least one radio controller, to which the new RU is assigned, uses at least one NETCONF session to indicate a number of carriers that the new RU needs to establish for the respective radio controller.

6. The distributed RAN of claim 1,
wherein the new RU implements multiple RU instances in a single physical housing;
wherein each RU instance in the new RU utilizes a separate logical Ethernet port on the new RU; and
wherein each RU instance in the new RU shares a same physical Ethernet port and Media Access Control (MAC) address.

7. The distributed RAN of claim 6, wherein each of the multiple RU instances establishes a different carrier for a same one of the at least one radio controller to which the new RU is assigned.

8. The distributed RAN of claim 6, wherein more than one of the multiple RU instances establishes a same carrier for a same one of the at least one radio controller to which the new RU is assigned.

9. The distributed RAN of claim 6, wherein one RU instance in a multiple-instance RU establishes multiple carriers for a same one of the at least one radio controller to which the new RU is assigned.

10. The distributed RAN of claim 1, wherein the radio controllers are implemented in Third Generation Partnership Project Fifth Generation (5G) Central Units or Distributed Units, Third Generation Partnership Project Long Term Evolution (LTE) baseband controllers, or a head unit in a Distributed Antenna System (DAS).

11. A method for radio controller discovery performed in a distributed radio access network (RAN), comprising:
determining, at a new RU, its own Internet Protocol (IP) address based on its Media Access Control (MAC) address;
sending, from the new RU, a discovery message to all radio controllers in a front-haul network via a multicast address;
receiving, at each of a plurality of radio controllers communicatively coupled to the new RU via the front-haul network, the discovery message and determining whether the new RU is assigned to the respective radio controller; and
establishing at least one configuration session with the new RU.

12. The method of claim 11, wherein the discovery message is a multicast Internet Protocol version 6 (IPv6) neighbor solicitation message.

13. The method of claim 11, further comprising determining, at each of the plurality of radio controllers, whether the new RU is assigned to the respective radio controller by determining whether a link-local IP address of the new RU corresponds to an IP address derived from a MAC address in a whitelist stored in the respective radio controller.

14. The method of claim 11, wherein each configuration session is a Network Configuration Protocol (NETCONF) session that configures the new RU to be operational in the distributed RAN.

15. The method of claim 11, wherein each of the at least one radio controller, to which the new RU is assigned, uses at least one NETCONF session to indicate a number of carriers that the new RU needs to establish for the respective radio controller.

16. The method of claim 11,
wherein the new RU implements multiple RU instances in a single physical housing;
wherein each RU instance in the new RU utilizes a separate logical Ethernet port on the new RU; and wherein each RU instance in the new RU shares a same physical Ethernet port and Media Access Control (MAC) address.

17. The method of claim 16, wherein each of the multiple RU instances establishes a different carrier for a same one of the at least one radio controller to which the new RU is assigned.

18. The method of claim 16, wherein more than one of the multiple RU instances establishes a same carrier for a same one of the at least one radio controller to which the new RU is assigned.

19. The method of claim 16, wherein one RU instance in a multiple-instance RU establishes multiple carriers for a same one of the at least one radio controller to which the new RU is assigned.

20. The method of claim 11, wherein the radio controllers are implemented in Third Generation Partnership Project Fifth Generation (5G) Central Units or Distributed Units, Third Generation Partnership Project Long Term Evolution (LTE) baseband controllers, or a head unit in a Distributed Antenna System (DAS).

21. A distributed radio access network (RAN), comprising:
a new radio unit (RU) being connected to a plurality of radio controllers via a front-haul network and configured to request, from a Dynamic Host Configuration Protocol (DHCP) server after the new RU powers up a first time, IP addresses for each radio controller it is assigned to; and
the DHCP server configured to send a response to the new RU indicating a number of Internet Protocol (IP) addresses equal to a number of carriers the new RU needs to establish, each of the IP addresses belonging to a radio controller the new RU is assigned to;
wherein the new RU initiates a different configuration session for each carrier it needs to establish with each radio controller it is assigned to.

22. The distributed RAN of claim 21, wherein the response from the DHCP server also indicates the new RU's Internet Protocol (IP) address.

23. The distributed RAN of claim 21, wherein the new RU determines its own Internet Protocol (IP) address based on its Media Access Control (MAC) address.

24. The distributed RAN of claim 21, wherein the IP addresses are Internet Protocol version 6 (IPv6), Internet Protocol version 4 (IPv4) addresses, or a combination of both.

25. The distributed RAN of claim 21, wherein each configuration session is a Network Configuration Protocol (NETCONF) session that configures the new RU to be operational in the distributed RAN.

26. The distributed RAN of claim 21, wherein the response from the DHCP server indicates a number of carriers that the new RU needs to establish with each radio controller to which it is assigned.

27. The distributed RAN of claim 21,
wherein the new RU implements multiple RU instances in a single physical housing;
wherein each RU instance in the new RU utilizes a separate logical Ethernet port on the new RU; and wherein each RU instance in the new RU shares a same physical Ethernet port and Media Access Control (MAC) address.

28. The distributed RAN of claim 27, further comprising establishing, at each of the multiple RU instances, a different carrier for a same radio controller to which the new RU is assigned.

29. The distributed RAN of claim 27, wherein each RU instance is configured using a separate configuration session.

30. The distributed RAN of claim 28, wherein the response indicates IP addresses for radio controllers associated with different network operators.

31. A method for radio controller discovery performed in a distributed radio access network (RAN), comprising:
requesting, from a Dynamic Host Configuration Protocol (DHCP) server after a new radio unit (RU) powers up a first time in a front-haul network, IP addresses for each radio controller the new RU is assigned to;
sending, from the DHCP server, a response to the new RU indicating a number of Internet Protocol (IP) addresses equal to a number of carriers the new RU needs to establish, each of the IP addresses belonging to a radio controller the new RU is assigned to; and
initiating, by the new RU, a different configuration session for each carrier it needs to establish with each radio controller it is assigned to.

32. The method of claim 31, wherein the response from the DHCP server also indicates the new RU's Internet Protocol (IP) address.

33. The method of claim 31, wherein the new RU determines its own Internet Protocol (IP) address based on its Media Access Control (MAC) address.

34. The method of claim 31, wherein the IP addresses are Internet Protocol version 6 (IPv6), Internet Protocol version 4 (IPv4) addresses, or a combination of both.

35. The method of claim 31, wherein each configuration session is a Network Configuration Protocol (NETCONF) session that configures the new RU to be operational in the distributed RAN.

36. The method of claim 31, wherein the response from the DHCP server indicates a number of carriers that the new RU needs to establish with each radio controller to which it is assigned.

37. The method of claim 31,
wherein the new RU implements multiple RU instances in a single physical housing;
wherein each RU instance in the new RU utilizes a separate logical Ethernet port on the new RU; and wherein each RU instance in the new RU shares a same physical Ethernet port and Media Access Control (MAC) address.

38. The method of claim 37, further comprising establishing, at each of the multiple RU instances, a different carrier for a same radio controller to which the new RU is assigned.

39. The method of claim 37, further comprising configuring each RU instance using a separate configuration session.

40. The method of claim 31, wherein the response indicates IP addresses for radio controllers associated with different network operators.

* * * * *